(12) United States Patent
Xu et al.

(10) Patent No.: US 12,284,590 B2
(45) Date of Patent: *Apr. 22, 2025

(54) METHODS, APPARATUS, AND SYSTEMS FOR FAST PATH SWITCHING IN WIRELESS COMMUNICATIONS WITH USER EQUIPMENT (UE) COOPERATION

(71) Applicants: Hua Xu, Kanata (CA); Jianglei Ma, Kanata (CA)

(72) Inventors: Hua Xu, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,252

(22) Filed: Dec. 6, 2023

(65) Prior Publication Data

US 2024/0114430 A1    Apr. 4, 2024

Related U.S. Application Data

(63) Continuation of application No. 17/316,903, filed on May 11, 2021, now Pat. No. 11,849,382.

(Continued)

(51) Int. Cl.
*H04W 40/24* (2009.01)
*H04W 40/12* (2009.01)
(Continued)

(52) U.S. Cl.
CPC ......... *H04W 40/248* (2013.01); *H04W 40/12* (2013.01); *H04W 76/14* (2018.02); *H04W 76/15* (2018.02); *H04W 36/033* (2023.05)

(58) Field of Classification Search
None
See application file for complete search history.

(56) References Cited

U.S. PATENT DOCUMENTS 11,849,382 B2 * 12/2023 Xu ...................... H04W 76/15
2017/0294989 A1 * 10/2017 Chen .................... H04L 1/0018
(Continued)

FOREIGN PATENT DOCUMENTS

WO    2013041127 A1    3/2013
WO    2020077578 A1    4/2020

OTHER PUBLICATIONS

Intel Corporation, "Considerations on UE-to-NW Relay for ProSe", 3GPP TSG RAN WG2 Meeting #89bis, Apr. 20-24, 2015, Bratislava, Slovakia, R2-151111, 6 pages.
(Continued)

*Primary Examiner* — Brian S Roberts

(57) ABSTRACT

Multiple communication paths are established for communications between a User Equipment (UE) and a wireless communication network, before switching between those paths is initiated. Signaling that includes an explicit indication that the UE is to switch between the multiple communication paths is transmitted to and received by at least the UE for which the multiple communication paths were established. Responsive to the explicit indication, communications are switched between the communication paths. At least one of the communication paths includes a relay path between the UE and the wireless communication network through another UE. Establishment of the multiple paths in advance of the switching may be useful in enabling fast switching with low latency and/or no traffic loss.

20 Claims, 15 Drawing Sheets

Related U.S. Application Data

(60) Provisional application No. 63/031,005, filed on May 28, 2020.

(51) Int. Cl.
    *H04W 76/14* (2018.01)
    *H04W 76/15* (2018.01)
    *H04W 36/00* (2009.01)

(56) References Cited

U.S. PATENT DOCUMENTS

| | | |
|---|---|---|
| 2018/0206176 A1* | 7/2018 | Panteleev .............. H04W 72/20 |
| 2018/0213577 A1* | 7/2018 | Burbidge .............. H04W 76/10 |
| 2019/0104560 A1 | 4/2019 | Nuggehalli et al. |
| 2019/0335518 A1* | 10/2019 | Dimitrovski .......... H04W 76/30 |
| 2019/0373493 A1 | 12/2019 | Uchiyama et al. |
| 2020/0154333 A1 | 5/2020 | Paladugu et al. |
| 2020/0260303 A1 | 8/2020 | Chen et al. |
| 2021/0352525 A1 | 11/2021 | Hong |
| 2022/0322173 A1 | 10/2022 | Chang et al. |
| 2022/0338302 A1 | 10/2022 | Zacharias et al. |
| 2022/0377822 A1* | 11/2022 | Wang .................... H04W 76/20 |

OTHER PUBLICATIONS

Huawei, HiSilicon, "Path switch procedure from cellular link to relay link", 3GPP TSG-RAN WG2 Meeting#97bis, Spokane, Washington, USA, Apr. 3-7, 2017, R2-1703473, 5 pages.

Huawei, HiSilicon, "Solution for Key Issue #3: Service continuity via UE-to-Network Relay", SA WG2 Meeting #136, Reno, Nevada, USA, Nov. 18-22, 2019, S2-1911554, 4 pages.

* cited by examiner

METHODS, APPARATUS, AND SYSTEMS FOR FAST PATH SWITCHING IN WIRELESS COMMUNICATIONS WITH USER EQUIPMENT (UE) COOPERATION

CROSS-REFERENCE TO RELATED APPLICATIONS

The present application is a continuation of U.S. patent application Ser. No. 17/316,903, filed on May 11, 2021, and claims the benefit of U.S. Provisional Patent Application No. 63/031,005, filed on May 28, 2020, the entire contents of both of which are incorporated herein by reference.

FIELD

This application relates generally to communications in wireless communication networks, and in particular to communications that involve relay paths and User Equipment (UE) cooperation.

BACKGROUND

In Long Term Evolution (LTE), Device to Device (D2D) techniques in which UEs communicate directly with each other were studied and specified. Research focus in LTE D2D was primarily on communications between D2D devices. For New Radio (NR) Vehicle to anything (V2X) scenarios, D2D-related research is focused on "Uu link" transmissions between a gNodeB (gNB) and UEs, and on sidelink (SL) transmissions between UEs.

UE cooperation is a communication technique that focuses on cooperative procedures among UEs in a group of UEs. UE cooperation can be used to enhance system throughout, coverage, and capacity, and may also improve communication latency and reliability. UE cooperation can benefit scenarios such as V2X, as well as others such as enhanced Mobile Broadband (eMBB) and Ultra-Reliable Low Latency Communication (URLLC).

UE cooperation may be achieved by a group of UEs helping each other with either or both of Uu link transmissions and sidelink transmissions. UE cooperation involves interactions among the UEs in a group for the purpose of transmission and reception.

Relay is another technology relevant to the above scenarios, and is widely used to improve the coverage of a wireless access network. A relay node is mainly deployed by a network operator at a fixed site. So-called "UE relay" provided a more flexible alternative. There are different types of UE relays, including Layer 2 (L2) relays and Layer 3 (L3) relays. Some current mobile relay techniques are used only to satisfy urgent needs such as basic public safety, where the data rate is low and the latency requirement is not very high.

Other relay-based techniques that are more generally suited to various scenarios or applications and to potentially improving communication system performance may be desirable.

SUMMARY

Supporting multiple-path establishment and inter-path switching, with at least one relay path, may be viable for such purposes as improving system performance in latency or throughput for emerging and important applications. Techniques that involve switching between established paths that include one or more relay paths may be especially useful for application in scenarios such as in-coverage and out-of-coverage scenarios.

One aspect of the present disclosure relates to a method that involves: receiving, by a UE, signaling comprising an explicit indication that the UE is to switch between multiple communication paths that have been established for communications with a wireless communication network, before the signaling is received; and switching, by the UE responsive to the explicit indication, between the first communication path and the second communication path for communications with the wireless communication network. The multiple communication paths include a first communication path and a second communication path. The first communication path includes a relay path between the UE and the wireless communication network. The second communication path may include a direct path or another relay path between the UE and the wireless communication network.

Another method involves: communicating, by a first UE involved in a relay path that comprises a first communication path between a wireless communication network and a second UE, signaling comprising an explicit indication that the second UE is to switch between the first communication path and a second communication path for communications with the wireless communication network; and operating, by the first UE, in a manner consistent with the switch between the first communication path and the second communication path by the second UE. The first communication path and the second communication path are multiple communication paths that have been established for communications between the wireless communication network and the second UE, before the signaling is communicated.

A further aspect of the present disclosure relates to a method that involves determining whether a path switch condition is satisfied. The path switch condition comprises a condition for a UE to switch between multiple communication paths that have been established for communications with a wireless communication network, before the determining. Such a method may also involve transmitting, responsive to determining that the path switch condition is satisfied, signaling to cause the UE to switch between the first communication path and the second communication path for communications with the wireless communication network. The multiple communication paths include a first communication path and a second communication path, and the first communication path comprises a relay path between the UE and the wireless communication network. The signaling comprises an explicit indication that the UE is to switch between the first communication path and the second communication path for communications with the wireless communication network.

According to another aspect of the present disclosure, an apparatus includes a communication interface; a processor, coupled to the communication interface; and a non-transitory computer readable storage medium, coupled to the processor, storing programming for execution by the processor, the programming including instructions to perform a method as disclosed herein.

A computer program product in accordance with a further aspect includes a non-transitory computer readable storage medium storing programming, the programming including instructions to perform a method as disclosed herein.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings.

DETAILED DESCRIPTION

Figure 1:
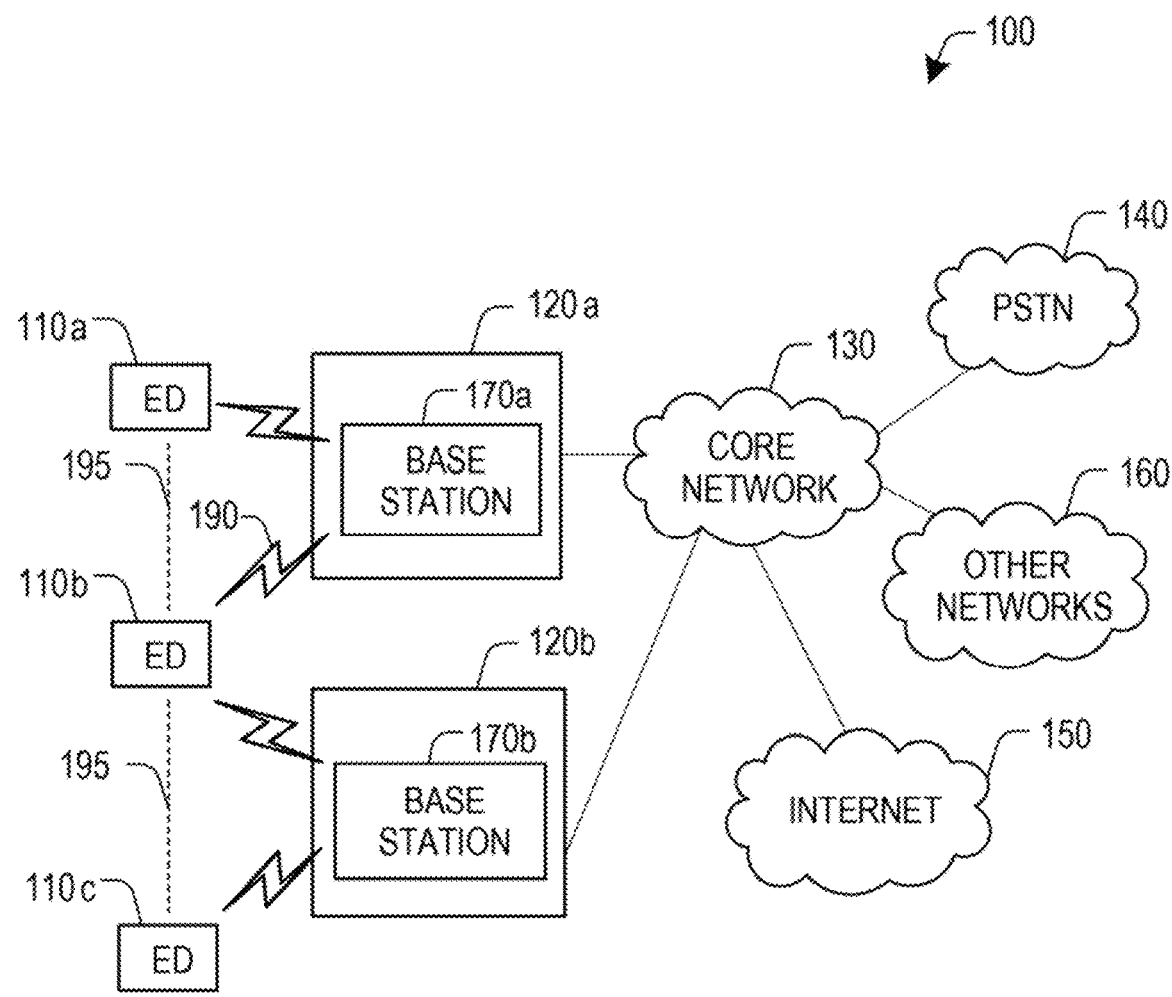
FIG. 1 illustrates an example communication system in which aspects of the present disclosure are implemented in some embodiments.

As noted above, relay links may be viable for such purposes as improving system performance in latency or throughput for emerging and important applications. Examples of new use cases include video monitoring and feedback for industrial manufacturing or for public authorities such as firefighters or police in providing enhanced public safety service. These use cases, or others, may have targets or requirements that cannot be satisfied by current UE relay link designs. Such targets or requirements may include, for example, one or more of: higher data throughput, at a level of tens of Megabits per second (Mbps) for example; low latency, on the order of milliseconds (ms) for example; or service continuity when communications are switched between links. Link switching with UE cooperation and one or more relay links, as disclosed herein, may provide a feasible solution toward satisfying one or more of such targets or requirements. Some embodiments herein involve providing support for multiple-link establishment, by configuration or otherwise, including one or more relay links, and allowing fast switching among the multiple links. For example, some embodiments relate to scenarios in which multiple UE relay links are established, and may support fast path switching without packet loss, to satisfy a contingent service continuity requirement for commercial use cases. An ultimate goal of fast path switching may be to reach so-called "0ms switching" or switching with so-called "0ms interruption", to provide seamless switching and seamless UE experience when communications are switched between paths.

Fast path switching or "0ms" path switching could have different reference points. For example, if the reference point is at a Packet Data Convergence Protocol (PDCP) layer, then 0ms path switching could mean that one PDCP package is transmitted on one link while a next PDCP package is transmitted on another link without latency. If the reference point is at a physical (PHY) layer, then 0ms path switch could mean that data in a first slot is transmitted on one link while data in a next slot is transmitted on another link. In general, fast link switching, fast path switching, 0ms link switching, and 0ms path switching as used herein all refer to switching communications between multiple links or paths with a switching time on the order of 1 ms or less, in comparison with switching times on the order of hundreds of ms or more for other switching techniques.

The present disclosure encompasses embodiments that address several issues, including multiple-link establishment for in-coverage and out-of-coverage remote UEs, signaling for fast path switching which may include any of various types of signaling or messaging, and procedures associated with link or path switching. Such procedures include network device procedures and different types of UE procedures. Links or paths may be established in any of various ways, including but not limited to establishment by configuration. For example, in some embodiments a link or path may be configured by higher layer signaling such as Radio Resource Control (RRC) signaling, whereas in other embodiments at least some information for establishing a path or a link could be obtained from one or more sources such as an initial cell search, a Master Information Block (MIB), or a System Information Block (SIB).

With reference first to FIG. 1, an example communication system 100 in which aspects of the present disclosure are implemented in some embodiments is shown. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (ED) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a UE, Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may be or include one or more of several well-known devices, such as a Base Transceiver Station (BTS), a Node-B (NodeB), an evolved NodeB (eNodeB), a Home eNodeB, a gNB (next generation NodeB), a Transmission Point (TP), a Transmission Reception Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, pWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations. The base stations of the NR cell may use the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and direct communication links 195 between UEs are represented by dashed lines in FIG. 1. UEs communicate directly with each other over sidelinks, for example, to enable UE cooperation and relay links in some embodiments, as described in further detail at least below.

One relay link technique that could be used to improve wireless communication network coverage, such as at cell edges or indoors, involves relaying data between a remote UE and a network device through a relay UE. In an uplink operation where data originates at the remote UE and is destined for a network device for example, the remote UE may be referred to as a Source UE (SUE) and the relay UE may be referred to as a Cooperative UE (CUE). For downlink communications, data is destined for the remote UE, and the remote UE may be referred to as a Target UE (TUE). These uplink and downlink relay techniques may involve transferring data between the CUE and the SUE or the TUE on a direct communication link such as a sidelink between the CUE and the SUE or the TUE. The remote UE, whether it is a source or target UE, could be helped by these techniques. For example, if the remote UE is in a coverage hole, then a relay link may provide the remote UE with better connectivity than would otherwise be available to the remote UE.

The present disclosure concentrates primarily on multiple-link applications in which remote UEs are in some way assisted by one or more relay UEs. Although reference is made primarily to "relay UEs" herein, relay UEs may also be referred to in other ways, as CUEs or UE relays for example, both herein and elsewhere. Relay links refer to links that involve at least one intermediate component, including at least one relay UE. Relay links enable communications between a communication network and a remote UE. The remote UE may or may not be within network coverage.

In a cellular network, a UE could connect to the network directly, through a direct communication link such as a so-called "Uu" link or another cellular link, over a Uu air interface for example. A UE that is out of network coverage, or even in-coverage, could connect to the network indirectly, such as via a relay node or relay UE. This could improve such performance parameters as coverage of the network or system throughput, for example. As a UE is moved around or the UE operating environment varies over time, a communication link between the UE and a network device such as a gNB could become weaker. This applies to direct communication links and indirect communication links between a UE and a communication network. To maintain a connection or performance, for example, it may be desirable for communications between the UE and the network to switch links or paths from time to time. This is referred to herein as link switching or path switching. A path may include one or more segments, and in the case of a relay path there are at least two segments and at least one intermediate component such as a relay UE. While elsewhere in the field a "segment" may be known equivalently as a "link", the present application instead refers to a link as including one or more segments. Therefore, "link" and "path" are used interchangeably herein.

For some commercial use cases such as monitoring video for public safety (e.g., firefighters or policeman at the scene) or real time factory manufacturing monitoring and control, targets or requirements for such parameters as packet loss or latency due to path switching can be quite stringent in order to maintain high quality service continuity. Fast link or path switching to satisfy such targets or requirements may be quite useful.

Path switching was studied in LTE under Further enhancement D2D (FeD2D), with focus on wearable devices as a remote UE and mobile phones as relay nodes. The relay structure proposed under FeD2D is L2 relay, where a RAN has more control. In FeD2D, the method to achieve path switching is to reconfigure the link that the remote UE is going to use. Although this might not lead to loss of any packets, the reconfiguration would take time and lead to longer latency, which may not be tolerable for at least some use cases. If L3 relay is used, then the situation may be even worse, because in L3 relay the RAN is not aware of the remote UE and has no control of the relay UE or remote UE. The RAN will not be aware of a link that becomes weak or fails, which can lead to packet loss. Path switching in L3 relay may take an even longer time than for L2 relay, as studied in FeD2D. With new applications emerging in 5G NR for sidelink-based relay having higher data rates and more stringent service continuity targets or requirements, for example, current path switching techniques might not be sufficient.

Several link or path switching scenarios are considered herein as illustrative examples. It should be appreciated that embodiments are not in any way limited to these specific scenarios, and that features disclosed herein may also or instead be applicable to other scenarios.

Figure 2:
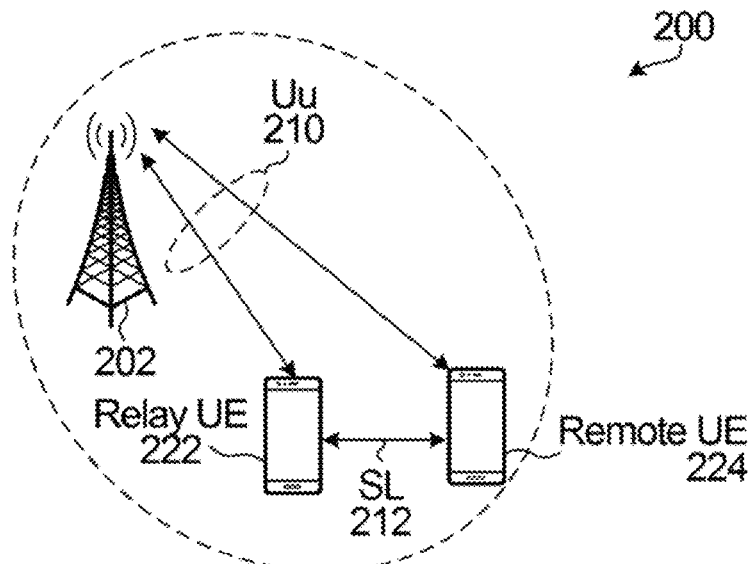
FIG. 2 is a block diagram of another example communication system, illustrating multiple communication links.

FIG. 2 is a block diagram of another example communication system illustrating multiple communication links, in accordance with one scenario. The example system 200 includes network equipment 202, also referred to herein as a network device, and UEs including a relay UE 222 and a remote UE 224. Communications between the UEs 222, 224 and the network equipment 202 are through direct communication links shown by way of example as "Uu" links 210 in FIG. 2, and sidelink communications directly between the UEs are through a sidelink 212. Examples of these components and implementation options for communications between these components are provided elsewhere herein. Network equipment 202 may be a network device or equipment such as a base station 170a, 170b in FIG. 1 and the UEs may be EDs 110a-c in FIG. 1, for example.

FIG. 2 represents a scenario in which both the relay UE 222 and the remote UE 224 are "in-coverage" (within a geographical area of direct communication with the network equipment 202). There are two links between the network equipment 202 and the remote UE 224 in the example shown. One link is a direct link, shown by way of example as a Uu link 210. The other link is an indirect relay link that includes a direct link segment between the network equipment 202 and the relay UE 222 and a sidelink segment between the relay UE 222 and the remote UE 224. In this scenario, with both links connecting to a gNB as an example of the network equipment 202, switching between these two links may be referred to as intra-gNB link switching.

Figure 3:
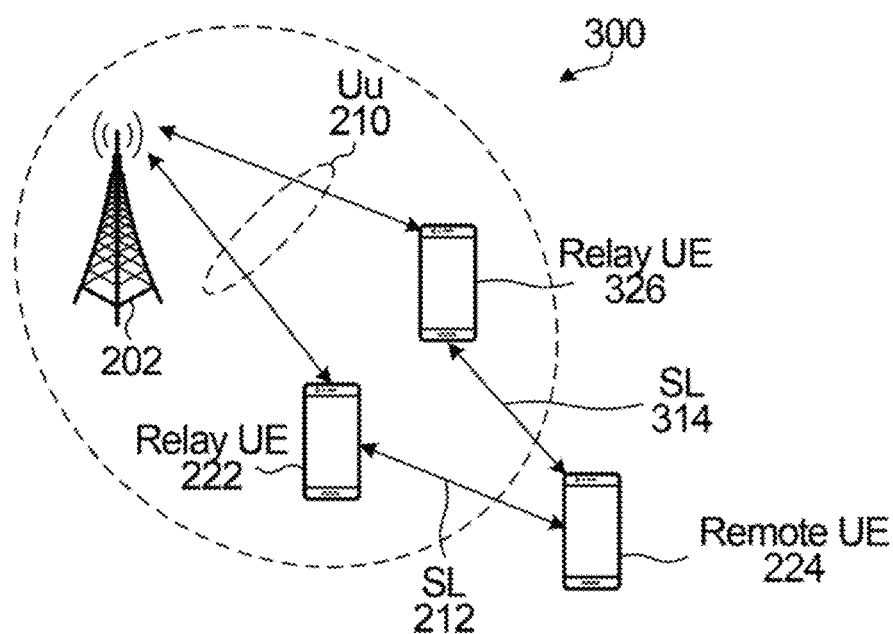
FIG. 3 is a block diagram of another example communication system, illustrating another multiple-link scenario.

FIG. 3 is a block diagram of another example communication system, illustrating another multiple-link scenario. The example 300 differs from the example 200 in that the remote UE 224 is "out-of-coverage" (outside of a geographical area of direct communication with network equipment 202) but is in communication with two in-coverage relay UEs 222, 326 in FIG. 3. There are still two links between the network equipment 202 and the remote UE 224 in the example 300. Each of the two links in FIG. 3 is an indirect relay link and includes a direct link segment between the network equipment 202 and a relay UE 222, 326, and a sidelink segment between each relay UE 222, 326 and the remote UE 224 over a sidelink 212, 314. Considering the above example of both links connecting to a gNB as the network equipment 202, switching between the two relay links in FIG. 3 is another possible scenario for intra-gNB link switching.

Figure 4:
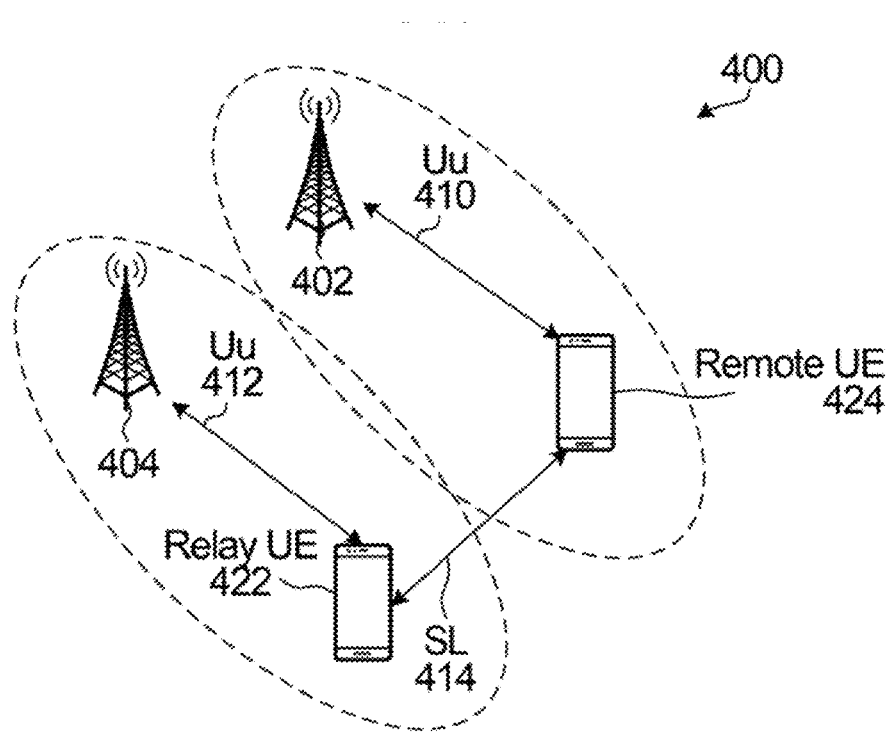
FIGS. 4 and 5 are block diagrams of further example communication systems illustrating additional multiple-link scenarios.
Figure 5:
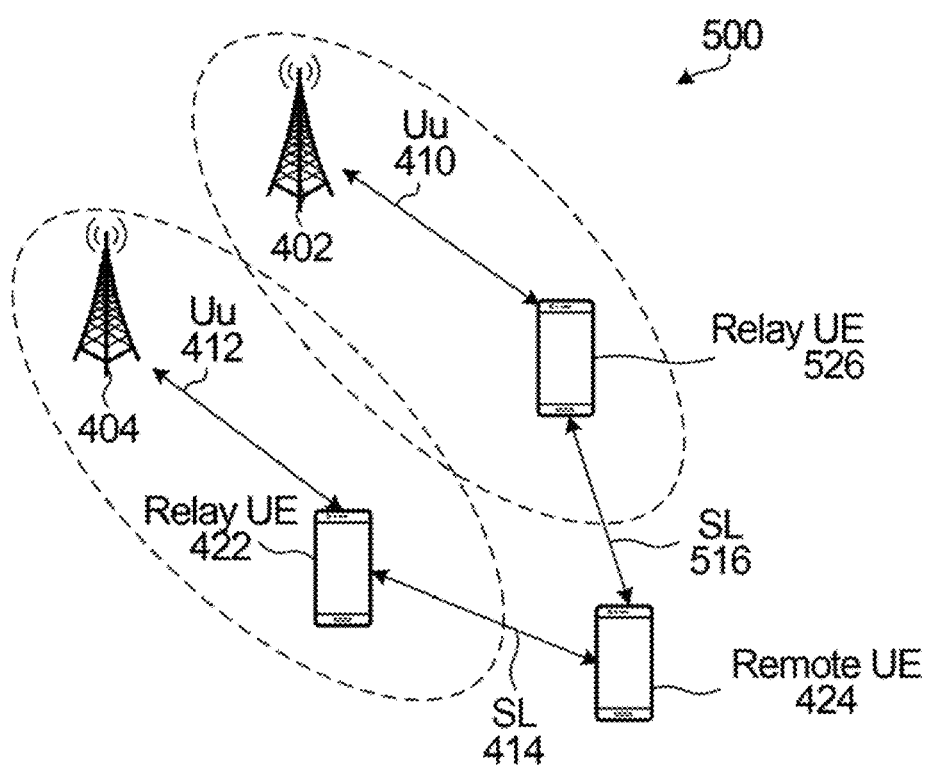

Different links need not necessarily involve the same network equipment 202 as shown in FIGS. 2 and 3. FIGS. 4 and 5 are block diagrams of further example communication systems illustrating additional multiple-link scenarios, in which UEs communicate with different network equipment.

In the example 400 in FIG. 4, the network equipment 402, 404 may be different TRPs for example, with which the relay UE 422 and the remote UE 424 communicate over Uu direct link segments 410, 412. The remote UE 424 is in-coverage of the network equipment 402, but out-of-coverage of the network equipment 404. The relay UE 422 is in-coverage of the network equipment 404, but out-of-coverage of the network equipment 402. There are two links between the remote UE 424 and network equipment in FIG. 4, including a direct link between the remote UE 424 and the network equipment 402 and an indirect relay link between the remote UE and the network equipment 404. The indirect relay link includes a direct link segment between the network equipment 404 and the relay UE 422, and a sidelink segment between the relay UE and the remote UE 424 over a sidelink 414. Considering an example of each of the links connecting to a different gNB as the network equipment 402, 404, switching between the two links in FIG. 4 is a form of inter-gNB link switching.

FIG. 5 provides an example scenario for inter-network equipment switching, such as inter-gNB link switching. The example 500 in FIG. 5 is similar to the example 400 in FIG. 4, except that the remote UE 424 is out-of-coverage of both the network equipment 402 and the network equipment 404 in FIG. 5, and there are two indirect relay links in FIG. 5 instead of one direct link and one indirect relay link as in FIG. 4. Each relay link in FIG. 5 includes a direct link segment 410, 412 between network equipment 402, 404 and a relay UE 422, 526, and a sidelink segment between each relay UE and the remote UE 424 via a sidelink 414, 516.

FIGS. 2 to 5 represent example communication systems and multiple-link scenarios. The present disclosure is not limited only to such scenarios. In general, multiple links may be established between a communication network and a UE. Those links include at least one relay link, and the other link(s) may include other relay links and/or direct links between a network device and the UE.

Regarding relay links, a relay link may include one, or more than one, relay UE. For example, a relay link may include a direct link segment between a network device and an in-coverage relay UE, such as a Uu link segment, and one or more sidelink segments. Multiple relay UEs may communicate with each other via a sidelink, and not all relay UEs need necessarily be in-coverage. An out-of-coverage UE may communicate with an in-coverage relay UE and an out-of-coverage remote UE over respective sidelinks, for example. Therefore, in some embodiments, a relay link may involve one or more relay UEs and one or more other UEs for assisting a remote UE. An assisting UE may be implemented or classified as another remote UE or another relay UE, and as such may be referred to as "helping" remote UEs, helping relay UEs, secondary relay UEs, or some other variation.

For fast link or path switching and service continuity, in some embodiments multiple links are established between a communication network and a remote UE. Those links include at least one indirect relay link and may also include one or more direct links, at any time. This may better enable a RAN, for example, to apply dynamic path switching without the need to establish or re-establish, by configuration or reconfiguration for example, a new link when switching is to be performed. References to establishing or configuring a link or path are intended to be taken in a general sense, and not to imply any particular connection setup protocol or procedure. For a direct link, via a Uu interface for example, some of the parameters of the link may not be obtained from configuration from higher layer signaling but from system information such as MIB/SIB. However, this could still be considered a form of link establishment or configuration. During link establishment/configuration, hand-shaking procedures could be conducted between a network device and a UE. After those procedures are accomplished, a full or partial protocol stack is established between the network device and UE, so that the link is ready for transmission/reception. The link could support full/partial functions from lower protocol stack layers to certain upper layers for data communication, and not just lower protocol stack layers.

Link or path switching may involve such features, operations, or steps as the following: establishing multi-link connectivity, with link or path information that may include any of various attributes or parameters; sending fast path switching signals, explicitly or implicitly, consistent with a signaling design for fast switching; and accomplishing the switching operation(s)/procedure(s), consistent with fast switching behaviors of network devices and UEs, including at least relay UEs and remote UEs.

Potential advantages of solutions proposed herein include low latency or even 0ms link or path switching with lossless transmission (in the sense of no packet or traffic loss) during switching, which may be useful in satisfying stringent commercial use case targets or requirements for such parameters as service continuity.

In some embodiments, multi-link or multi-path connectivity can be established simultaneously, in the sense that there are multiple established links or paths at one time. Links can be established together (using the same signaling such as Radio Resource Control (RRC) signaling that includes respective configurations/reconfiguration for multiple links for example) or separately (using different signaling such as separate RRC signaling for configuration/reconfiguration of each link for example, or using an initial access technique to establish a direct link). "Simultaneous" and similar terms are used herein to convey the notion that multiple links are established and can be used for communication at the same time and thus are available for fast link switching. It should be noted that after multiple links are established, even though they could all have communication capability from a physical layer perspective, in some embodiments they might not all be used for data communication at the same time and only one of them is mainly used for data communication at a time; alternatively, in some embodiments or at some times, multiple links could all be used for data communication at the same time.

A link or path may include a direct link segment only such as a Uu link segment, or both a direct link segment and one or more sidelink segments in the case of an indirect relay link.

Information related to a remote UE link or path, also referred to generally herein as a configuration for a remote UE link or path, may include such information as a relay UE ID or other form of identifier for each relay UE, if any, that is involved in a link or path; and a remote UE ID or other form of identifier for the remote UE. With reference to FIG. 5, for example, a configuration for the communication link between the network equipment 402 and the remote UE 424 may include respective identifiers of the relay UE 526 and the remote UE, and a configuration for the communication link between the network equipment 404 and the remote UE may include respective identifiers of the relay UE 422 and the remote UE. A UE Radio Network Temporary Identifier (RNTI) is a non-limiting example of a UE identifier that may be used in a configuration.

A link or path configuration may also or instead include other information. For example, a configuration may include information that is indicative of one or more direct link attributes or direct link segment attributes, such as one or more of the following: control resource set(s) (CORESET(s)), Reference Signal (RS), Modulation and Coding Scheme (MCS), bandwidth part (BWP), Hybrid automatic repeat request (HARQ) process identifier (ID). Information indicative of one or more sidelink attributes or sidelink segment attributes may also or instead be included in a configuration for a relay link. Examples include any one or more of the following: resource pool, RS, HARQ process ID.

The establishment of a link could be initiated by a network device such as a gNB. That may include such operations as any one or more of: link measurement and reporting, communication establishment of the link, and completing configuration of the link. For example, RRC signals could be used to complete the configuration. The RRC configuration/reconfiguration signals or similar signals can be sent from a gNB to the remote UE for example, to establish link connectivity, and RRC configurationComplete/reconfigurationComplete or similar signals could be sent from the remote UE to the gNB/relay UE(s) to complete the configuration/establishment of a link. For a relay link, the direct link segment between a relay UE and a gNB can be established following a normal access procedure defined in NR Release 15 for example, and therefore in some embodiments only the SL segment may need to be established. Similarly, the establishment of a direct link between a remote UE and a gNB can follow the conventional handover (HO) procedure as defined in NR Release 15 in some embodiments. After establishment of a link is completed, the link could be used for data and/or control signal transmission. The remote UE could monitor the Physical downlink control channel (PDCCH)/Physical downlink shared channel (PDSCH) on a direct link or Physical sidelink control channel (PSCCH)/Physical sidelink shared channel (PSCCH) on an SL to receive transmissions.

Figure 6:
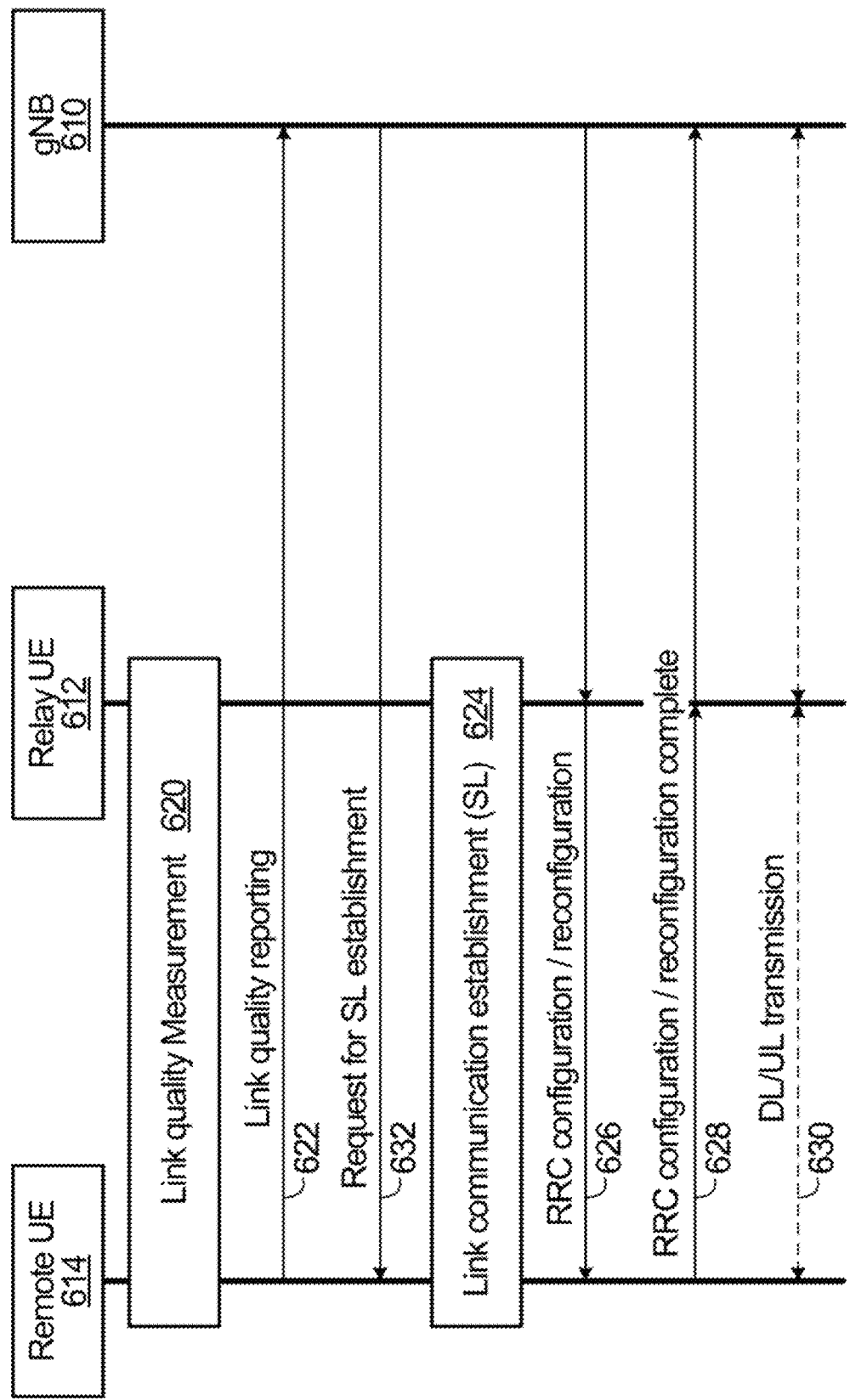
FIG. 6 is a signal flow diagram illustrating an example of establishment of a sidelink segment of a relay link between a remote UE and a relay UE.

FIG. 6 is a signal flow diagram illustrating an example of establishment of an SL segment of a relay link between a remote UE and a relay UE. The gNB 610 in this example has configured the remote UE 614 to measure link quality of various links at 620, including direct links and SL segments of indirect links in some embodiments. The measurement report(s) could be sent to the gNB 610 at 622 on a current link that the remote UE 614 is using for communications with the gNB. The gNB 610 could decide whether a new link is to be established. In this example, if a decision is made to establish a new link via a relay UE 612 (i.e., a relay ink), then the gNB 610 could send a request or other signaling, shown at 632, to the remote UE 614 to establish the sidelink segment between the remote UE and the relay UE 612 on the SL, at 624. After this is accomplished, the gNB 610 could send RRC configuration/reconfiguration signaling or other signaling at 626 via the relay UE 612 to the remote UE 614, or alternatively, directly to the remote UE 614. If the remote UE 614 receives that signaling successfully, then it could feed back to the gNB 610 an indication that RRC configuration or reconfiguration is complete. This type of indication may be or include, for example, an RRC configurationComplete/reconfigurationComplete or other signaling to the gNB 610, via the relay UE 612 at 628 in the example shown. The relay UE 612 may also establish an association with the remote UE 614 in some embodiments. After all these operations are accomplished, the relay link for the remote UE 614 is considered to be established and can be used for DL and/or UL data transmission as shown at 630.

In some embodiments, one link may be considered, viewed, or established as a primary link (or major link), and any other link(s) for path switching may be considered, viewed, or established as secondary links. For example, a direct link or indirect link that is expected to be more reliable than other links may be established or designated as the primary link. Configurations for any links (secondary links) other than a primary link can be sent to the relay UE (if any) and the remote UE via the primary link.

Consider the example 200 in FIG. 2. A gNB at 202 could establish one of the links between the gNB and the remote UE 224 as a primary link and establish the other link as a secondary link. A link configuration may include an index for each link, such as link #1 for the primary link, link #2 for the secondary link, and so on for any further secondary links for the remote UE 224.

A primary link and any secondary links may have different roles. For example, a primary link could be established first, and be subsequently used in establishing one or more secondary links. Primary and secondary roles may be switched or updated in some embodiments.

A link may be activated or enabled, for example as part of configuration or otherwise when the link is established, through separate signaling, or by transmitting data on the link after it has been established. Data may be transmitted on a link as scheduled or initiated by a gNB or other network device, as scheduled or initiated by the remote UE, as scheduled or initiated by a relay UE, or as scheduled or initiated by a helping remote UE. In some embodiments, a link can be disabled, deactivated, or released by reconfiguration, by ceasing data transmission over the link, or by signaling transmitted from one or more of a gNB or other network device, a relay UE, a helping remote UE, and a remote UE.

Link switching for communications between a remote UE and a communication network may be initiated after multiple links have been established, regardless of the particular process or approach that was used to establish those links. The links may be establish together or separately, and may or may not be designated or treated as a primary link and one or more secondary links. Establishment of multiple links simultaneously is preferable to enable faster path switching relative to conventional solutions such as RRC reconfiguration and deconfiguration or conventional handover (HO) or release of one link before a new link is established, which involve delays associated with accessing/communication establishment and configuration of the new link before switching can be completed. This concept of "access" is very important, because it involves more delay and is one main cause of more latency in conventional link switching. The present disclosure encompasses embodiments in which link establishment, which may include such access/configuration, is done before switching happens, as compared with conventional switching in which switching is initiated before the access/reconfiguration of a new link. Simultaneous multi-link establishment according to some embodiments herein may also or instead enable data transmission on multiple links at the same time, to potentially improve the peak data rate and system throughput for example.

Switching between links or paths may be initiated by explicit or implicit signaling. Signaling may initiate or cause link or path switching by specifying or otherwise indicating a link or path to which communications are to be switched, and/or a link or path that is to be deactivated or released.

In an embodiment, semi-static signaling is used. Examples of such signaling include RRC signaling or MAC-CE signaling in one or more MAC-CE messages.

Dynamic signaling may also or instead be used in link switching. Downlink Control Information (DCI), Sidelink Control Information (SCI) for relay links, one or more Medium Access Control-Control Elements (MAC-CEs), header information, or some other type of indication carried by data are all examples of information that may be used to signal switching between links. For example, an explicit indication may be provided in a field in DCI/SCI or in MAC-CE/header/indication carried by data, to indicate that path switching is to be performed. Monitoring of links by a UE may support an implicit switching indication. For example, a remote UE may monitor multiple established links, and receipt of DCI, SCI, or data on a link provides an implicit indication of the link to which the UE is to switch. Consider the above example of a direct link #1 and a relay link #2 in FIG. 2. In an embodiment, for switching from direct link #1 to relay link #2, a DCI could be sent from a gNB or other network device 202 to the relay UE 222, and the relay UE could receive PDSCH on link #2 and relay data to the remote UE 224. In this example, receipt of the DCI by the relay UE 222 on relay link #2 provides an implicit switching indication to the relay UE, and receipt of the data by the remote UE 224 on relay link #2 provides an implicit switching indication to the remote UE.

Semi-static signaling may be preferred for avoiding packet loss, but may increase latency relative to dynamic signaling. Therefore, dynamic signaling may be preferred over semi-static signaling for reducing latency. Explicit signaling or an explicit indication of switching may be preferred in some embodiments, for example to enable a remote UE or relay UE to more quickly stop monitoring a source link from which communications are to be switched, thereby saving power.

Different types of signaling can be used in some embodiments. For example, dynamic signaling could enable actual switching to a new link (target link) while semi-static signals could deactivate or release an old link (source link). As another example, dynamic signaling may be used on direct link segments, and semi-static signaling may be used on sidelink segments, or vice versa. Different types of indications may also or instead be used, with explicit signaling on direct link segments and implicit signaling on sidelink segments, or vice versa, for example.

Other features may be implemented with or without signaling. As an example, a timer could be used to set up a transition period after signaling triggers link or path switching. The timer could be configured or specified.

These are illustrative examples of signaling design and other features associated with triggering fast switching, to potentially enable lossless and 0ms fast switching for service continuity.

Turning now to actually accomplishing fast link or path switching, consider first the behavior or procedures provided or supported by a network device such as a gNB during switching. A network device, or potentially multiple network devices, may configure multiple links for a remote UE. Alternatively, the UE could establish the link with the help of the network devices. For fast switching between links, the multiple links are established at the same time, so that the established links are in place and available for fast path switching. In some embodiments, any relay UE(s) and the remote UE monitor the established links at the same time for communications. Network device behavior may include determining when to initiate or enable link or path switching and send any messaging or signaling or otherwise provide an indication to a relay UE, a remote UE, or both, to trigger the switching.

Signaling may carry a message or otherwise provide a switching command or indication. In an embodiment, a gNB or other network device could send RRC or MAC-CE signaling to one or more relay UEs, a remote UE, or both, to indicate link or path switching, or to indicate deactivation or release of a link. A gNB or other network device could also or instead send a DCI/header/indication carried by data to one or more relay UEs, a remote UE, or both a remote UE and relay UE(s), to indicate link or path switching, or to indicate deactivation or release of a link.

Signaling may be transferred over any of various links, including the following for example: a primary link; a current link (source link) from which the remote UE is to be switched (for example, during inter-gNB link switching, an activation (of the target link), path switching signal or a handover command (HO) could be sent by a source gNB from which the remote UE is to be switched); a new link (target link) to which the remote UE is to be switched (for example, during inter-gNB link switching, a deactivation, release (of the source link), path switching signal, or a data scheduling signal could be sent by a target gNB to which the remote UE is to be switched); or both current and new links.

An implicit switching indication may be provided in some embodiments, by a gNB or other network device sending data on the new link (target link) to which the remote UE is to be switched, ceasing data transmission on the old link (source link), or both, for example.

These are examples of network device behavior, procedures, or features. Other behaviors, procedures, or features may be provided in some embodiments.

Figure 7:
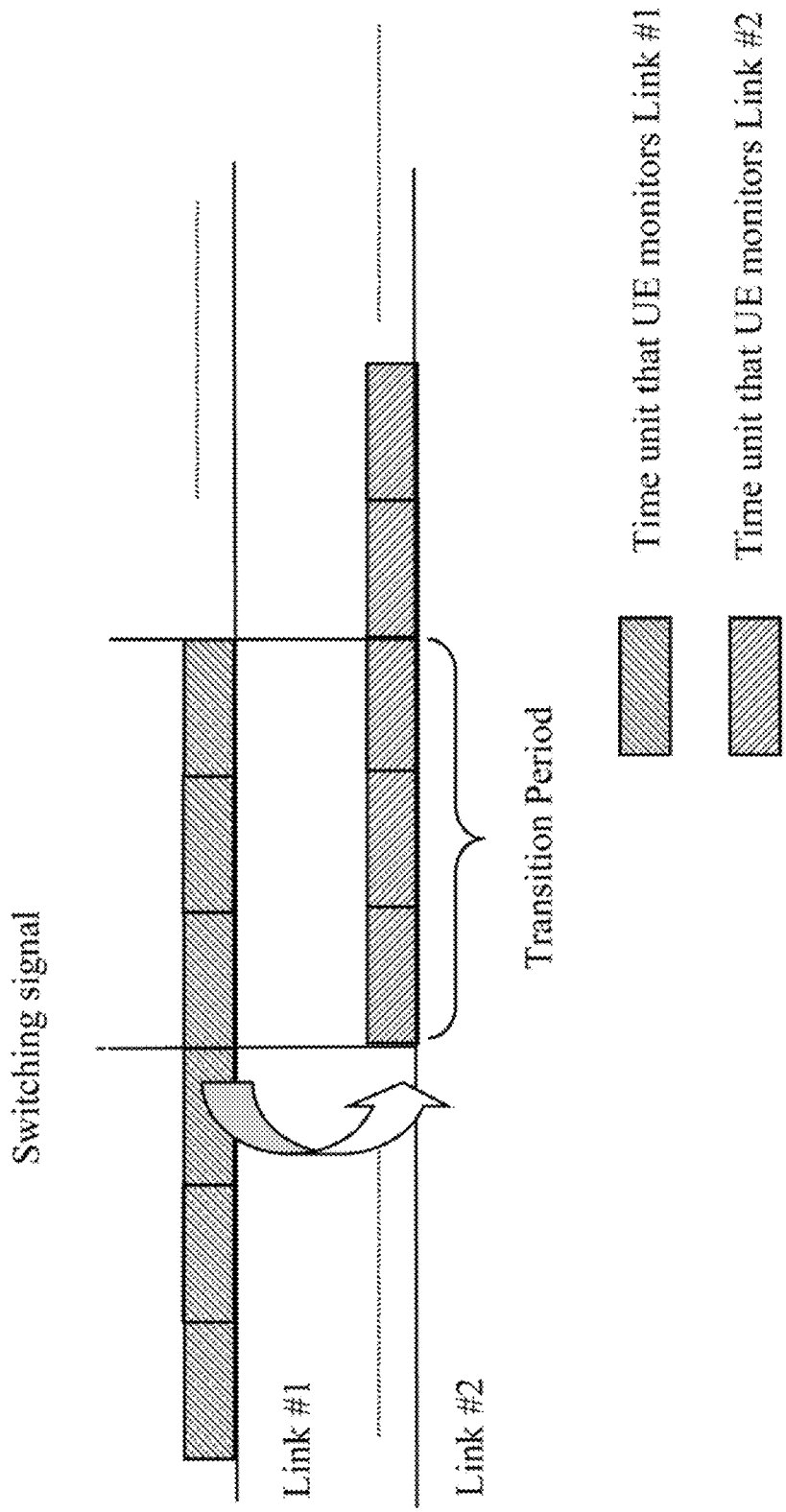
FIG. 7 is a block diagram illustrating an example of link switching behavior in an embodiment.

For example, FIG. 7 is a block diagram illustrating link switching behavior and a fast link switch with a transition period in an embodiment. In FIG. 7, path switching is accomplished from a link #1 to a link #2, and a network device such as a gNB or TRP could send duplicated data on both a current link or source link (e.g., link #1) and a new link or target link (e.g., link #2) during a transition period around a path switching instance. This may be useful in providing a smooth transition between links and avoiding data or traffic loss during switching, for example. During the transition period, the remote UE and any corresponding relay UE(s) involved in link #1 and link #2 could monitor both links and decode data if they are transmitted. The transition period could be determined by a timer starting after the switching signal. In another embodiment, switching is enabled or triggered by signaling, and further signaling is transmitted to deactivate or release an old link or path and end the transition period. Another possible option is to specify or otherwise indicate the length of a transition period in switching signaling.

A transition period during which communications over multiple links remain active may also or instead enable path switching after a HARQ process is completed on a current link. In other words, according to an embodiment, no HARQ process crosses different links, or put another way, a HARQ process does not cross different links.

Regarding relay UE behavior or procedures during link or path switching, after a relay link including a relay UE is configured, the relay UE monitors the direct link segment of that relay link to determine whether signaling or data for the remote UE are received. Any signaling or data destined for the remote UE are relayed, possibly after processing such as decoding and re-encoding by the relay UE, toward the remote UE.

If a source relay UE on a relay path that is currently active and being used for communications between the remote UE and a network device receives a path switching configuration, a deactivation or release configuration, or another switching indication such as a DCI/header/indication to indicate link or path switching away from its link, then the source relay UE could stop monitoring its direct link segment for signaling or data associated with the remote UE. This could be done after a transition period. An indication of the switching may be transmitted to the remote UE by the relay UE in some embodiments.

A target relay UE that is involved in a relay path that is not currently active for communications with a remote UE may receive a path switching configuration, an activation configuration, or another switching indication such as DCI/header/indication to indicate link or path switching to its link, and the target relay UE may then begin monitoring for data destined for the remote UE on its direct link segment, possibly decoding or otherwise processing that data, and relaying the data toward the remote UE over a sidelink. An indication of the switching may be transmitted to the remote UE by the relay UE in some embodiments Remote UE behavior or procedures during link or path switching may include monitoring multiple links after they are established, including one or more side link segments of relay links and possibly one or more direct links, to determine whether signaling or data for the remote UE from network device(s) or relay UE(s) are received. If the remote UE receives a path switching configuration, a deactivation or release configuration, or another path switching indication such as DCI/SCI/header/indication to indicate path switching away from a current link, then the remote UE could stop monitoring the current link. This could be done after a transition period. If the remote UE receives a path switching configuration, an activation configuration, or another indication such as DCI/SCI/header/indication to indicate path switching to a different link, then the remote UE may begin monitoring for and decoding data that is received on that different link.

During a transition period, a remote UE could monitor multiple links. This may be useful to smooth path switching and avoid traffic loss during switching, for example. The remote UE may also or instead maintain communications over a current link until a HARQ process completes, so that it would not be expected for a HARQ process cross different links.

Some behaviors or procedures may be common to relay UEs and remote UEs. For example, a relay UEs on a relay link from which a remote UE is to be switched may remain active to maintain communications over that link during a transition period and/or until completion of a HARQ process.

FIGS. 8 and 9A to 9F summarize procedures, timelines, signaling/data flows, and behaviors according to illustrative embodiments.

Figure 8:
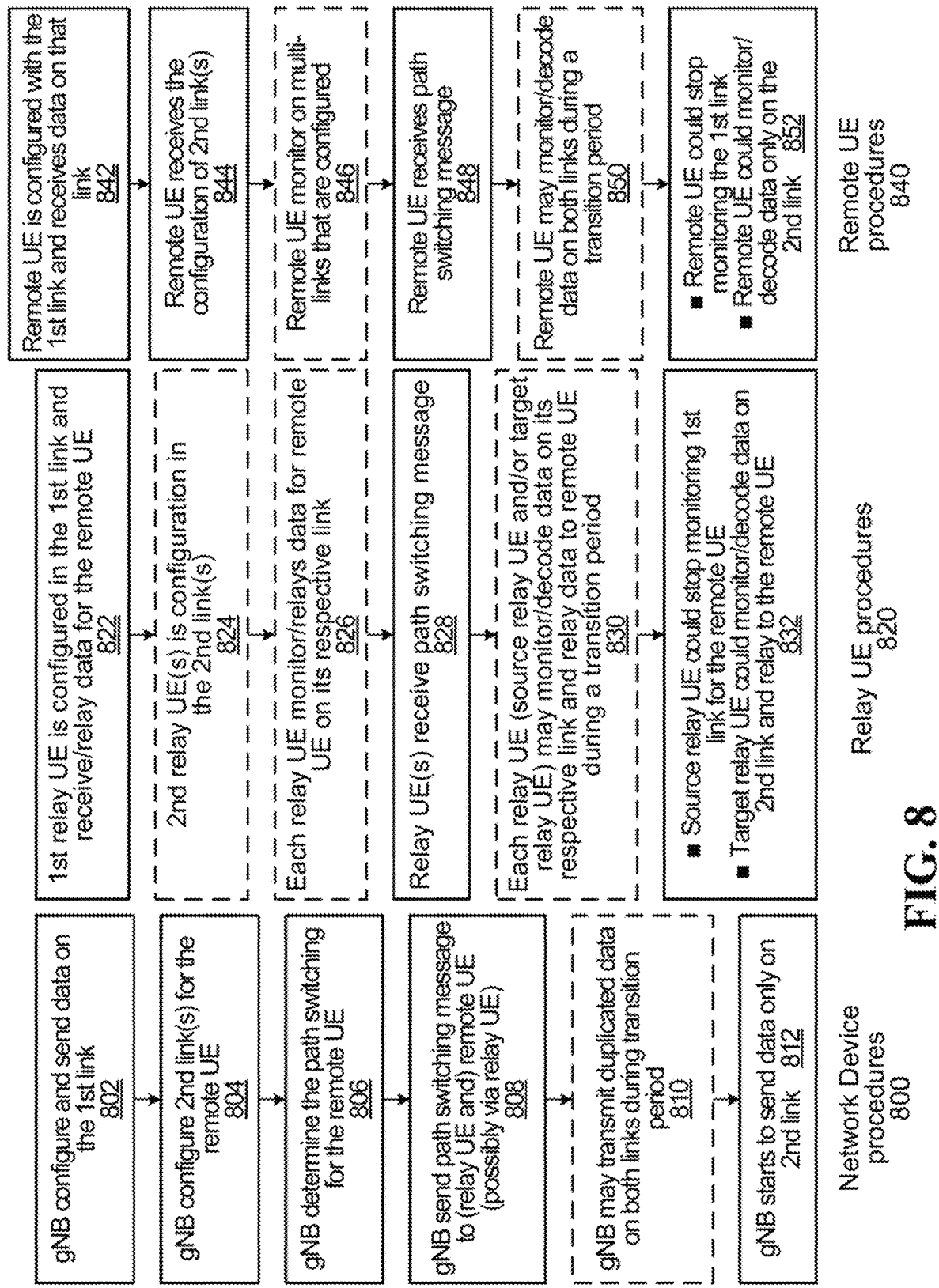
FIG. 8 includes flow charts illustrating methods according to embodiments.

FIG. 8 includes flow charts illustrating methods according to embodiments. There are three flow charts in FIG. 8, including one for each of example network device procedures at 800, example relay UE procedures at 820, and example remote UE procedures at 840. These examples are intended solely for illustrative purposes, and embodiments are not in any way restricted to these particular examples. Other embodiments may include further, fewer, or additional operations, performed in a similar or different order than shown.

With reference first to the network device example at 800, in the embodiment shown the network device is a gNB, which configures or otherwise establishes a first link and sends data on that link at 802. The gNB, or another gNB in the case of inter-gNB link switching for example, configures or otherwise establishes one or more second links for the same remote UE, at 804. At this point, no link switching has been initiated, but multiple links have been established.

A gNB, another device, or other equipment may determine whether path switching is to be performed for the remote UE, and at 806 an example in which a gNB determines that path switching is to be performed for the remote UE is shown. This determination may be made by a source gNB on a source link or a target gNB on a target link if different from the source gNB. In other embodiments, the switching determination is made elsewhere, such as by a relay UE or the remote UE.

A gNB, such as the gNB that makes the switching determination at 806, sends a path switching message to a relay UE and/or the remote UE (possibly via a relay UE) at 808. This message is an example of signaling that may be transmitted to initiate switching.

In some embodiments, data may be duplicated and duplicated or duplicate data is transmitted by one or more gNBs on both links during a transition period, as shown at 810. After a switch is completed, which may be after a transition period, data is sent only the target link, which is the second link in the example shown at 812.

Turning to example relay UE procedures at 820, for illustrative purposes it is presumed that at least the first link is a relay link, and at 822 a first relay UE is configured in the first link, to receive and relay data for the remote UE. One or more other links may also be relay links, in which case a relay UE is also configured for one or more other links at 824. In some embodiments, each relay UE monitors for and relays data for the remote UE on its respective link at 826. The same relay UE could potentially be part of multiple relay links, in the case of multi-hop relay links that involve multiple relay UEs but at least one common relay UE that is part of more than one link for example.

At 828, one or more relay UEs receive a path switching message, which as noted above is an example of signaling that may be transmitted to initiate switching. A source relay UE on a source link, a target relay UE on a target link, or both, may receive a switching message.

In some embodiments, data may be duplicated and duplicated or duplicate data is transmitted on both a source link and a target link during a transition period, and during that period one or more relay UEs may monitor for and decode data on its respective link as shown at 830. At 832, after a switch is completed and possibly after a transition period, a source relay UE could stop monitoring its link for data that is intended for the remote UE, and/or a target relay UE could start or continue monitoring its link for remote UE data, decoding that data, and relaying that data to the remote UE over the target link, which is the second link in the example shown.

Example remote UE procedures are shown at 840. A first link for the remote UE is configured or otherwise established at 842, and the remote UE monitors for and receives data on that link. One or more other links are also configured or otherwise established for the remote UE, and this is shown by way of example at 844 as the remote UE receiving a configuration of one or more second links. In some embodiments, the remote UE monitors multiple links for data at 846.

At 848, the remote UE receives signaling that initiates switching, in the form of a path switching message in the example shown. In some embodiments, data may be duplicated and duplicated or duplicate data is transmitted on both a source link and a target link during a transition period, and during that period the remote UE may monitor for and decode data on both links as shown at 850. At 852, after a switch is completed and possibly after a transition period, the remote UE could stop monitoring the source link, which is the first link in this example, and/or start or continue monitoring the target link, which is the second link in this example, for data.

Figure 9A:
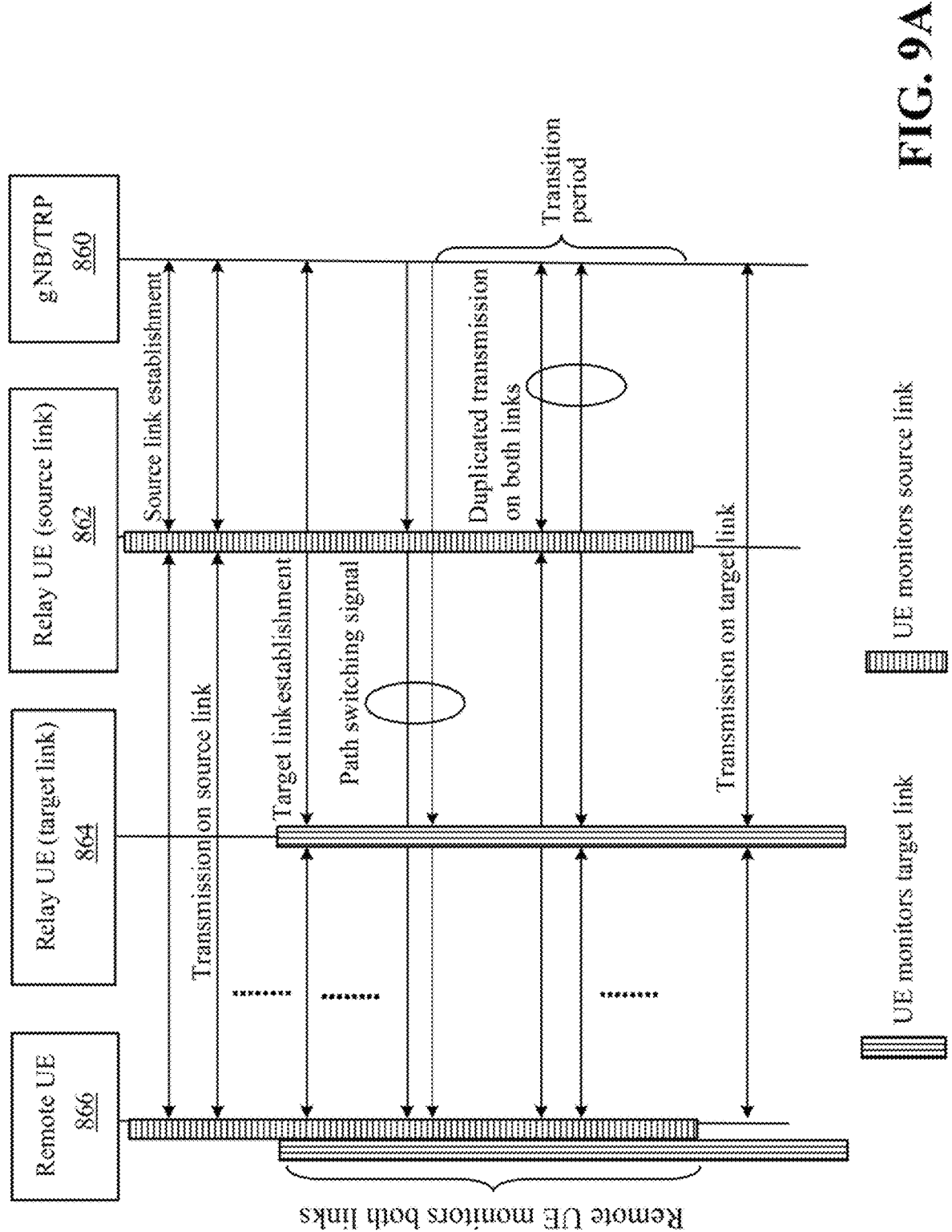
FIGS. 9A to 9F are signal flow diagrams illustrating example timelines and signaling/data flows for fast link (path) switching according to embodiments.

FIG. 9A illustrates an example timeline and signal/data flow for intra-gNB link switching from a source relay link to a target relay link. The example involves a network device 860 such as a gNB or a TRP, two relay UEs including a source relay UE 862 on the source link and a target relay UE 864 on the target link, and a remote UE 866. Source link establishment involves signaling between the network device 860 and the source relay UE 862, and signaling between the source relay UE 862 and the remote UE 866. After the source link has been established, data may be transmitted between the network device 860 and the remote UE 866 via the source relay UE 862.

The target link is also established in FIG. 9A before any switching is initiated, using signaling between the network device 860 and the target relay UE 864, and signaling between the target relay UE 864 and the remote UE 866. The remote UE 866 may monitor both the source link and the target link after the target link is established, regardless of whether both the source link and the target link are used for data transmission or only the source link is used for data transmission.

Switching signaling to initiate switching is transmitted to both relay UEs 862, 864 and to the remote UE 866 through the relay UEs in the example shown. During a transition period, duplicate data is transmitted on both the source link and the target link, between the network device 860 and the remote UE 866 through the relay UEs 862, 864. The remote UE 866 monitors both links for data during the transition period. At the end of the transition period, the remote UE 866 monitors only the target link and data transmission between the network device 860 and the remote UE is over only the target link through the target relay UE 864.

FIG. 9A represents an illustrative example, and variations are possible. For example, signaling and/or data transmission may involve downlink transmission, uplink transmission, or both as shown. It should also be noted that data transmission on the source link may take place before the target link is established (as shown), and/or after the target link is established. Although not shown in FIG. 9A, in some embodiments both the source link and the target link are used for data transmission before link switching after links are configured or established.

In other embodiments, switching signaling is sent on the source link, e.g., to the source relay UE 862 and the remote UE 866 via source relay UE 862 or on target link, e.g., to the target relay UE 864 and remote UE 866 via target relay UE 864, but not both.

The relay UEs 862, 864 communicate with the network device 860 and the remote UE 866 in the example shown, but the relay UEs may be able to communicate with each other over a sidelink for example. Data and/or signaling may be exchanged directly between the relay UEs 862, 864 in some embodiments.

Not all embodiments need necessarily support a transition period during which transmissions are duplicated over multiple links, or a transition period may be left as an implementation issue that is not specified in communication system requirements. For example, a path switching signal could serve as both a switching signal and a source link deactivation signal to achieve both link switching from the source link to the target link and deactivation of the source link (possibly after a transition period).

These and/or other variations may apply not only to the example in FIG. 9A, but also or instead to other examples or other embodiments.

Figure 9B:
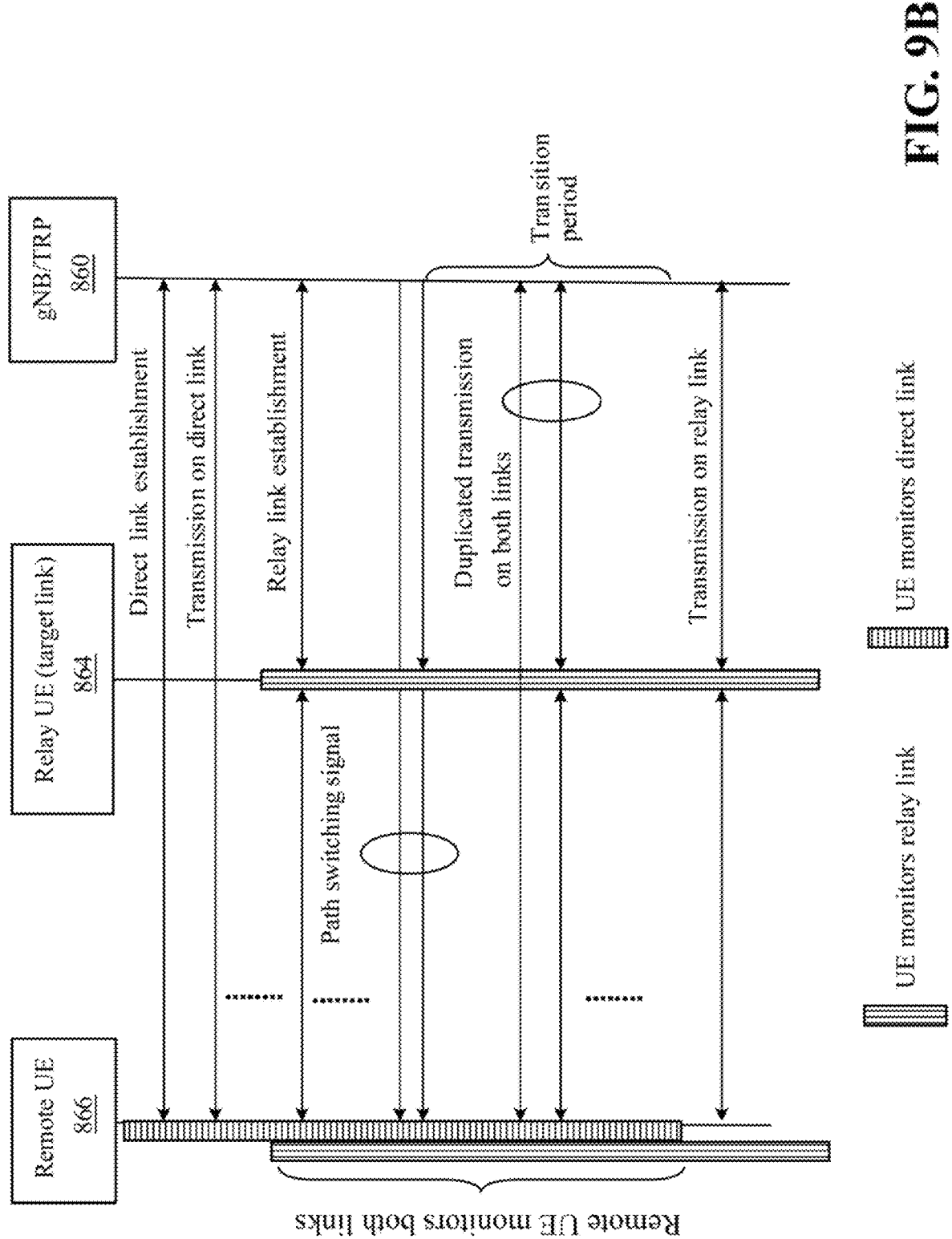

FIG. 9B illustrates an example timeline and signal/data flow for intra-gNB link switching from a source direct link to a target relay link. This example involves a network device 860 such as a gNB or a TRP, a target relay UE 864 on the target link, and a remote UE 866. Source link establishment for the direct link involves signaling between the network device 860 and the remote UE 866. After the source link has been established, data may be transmitted between the network device 860 and the remote UE 866 via the direct link.

The target relay link is also established in FIG. 9B before any switching is initiated, using signaling between the network device 860 and the target relay UE 864, and signaling between the target relay UE and the remote UE 866. The remote UE 866 may monitor both the source link and the target link after the target link is established, regardless of whether both the source link and the target link are used for data transmission or only the source link is used for data transmission.

Switching signaling to initiate switching is transmitted to the remote UE 866 over both the source direct link and the target relay link in the example shown. During a transition period, duplicate data is transmitted on both the source link and the target link. The remote UE 866 monitors both links for data during the transition period, and at the end of the transition period the remote UE 866 monitors only the target link. Data transmission between the network device 860 and the remote UE 866 is over only the target link through the target relay UE 864 after the transition period.

Figure 9C:
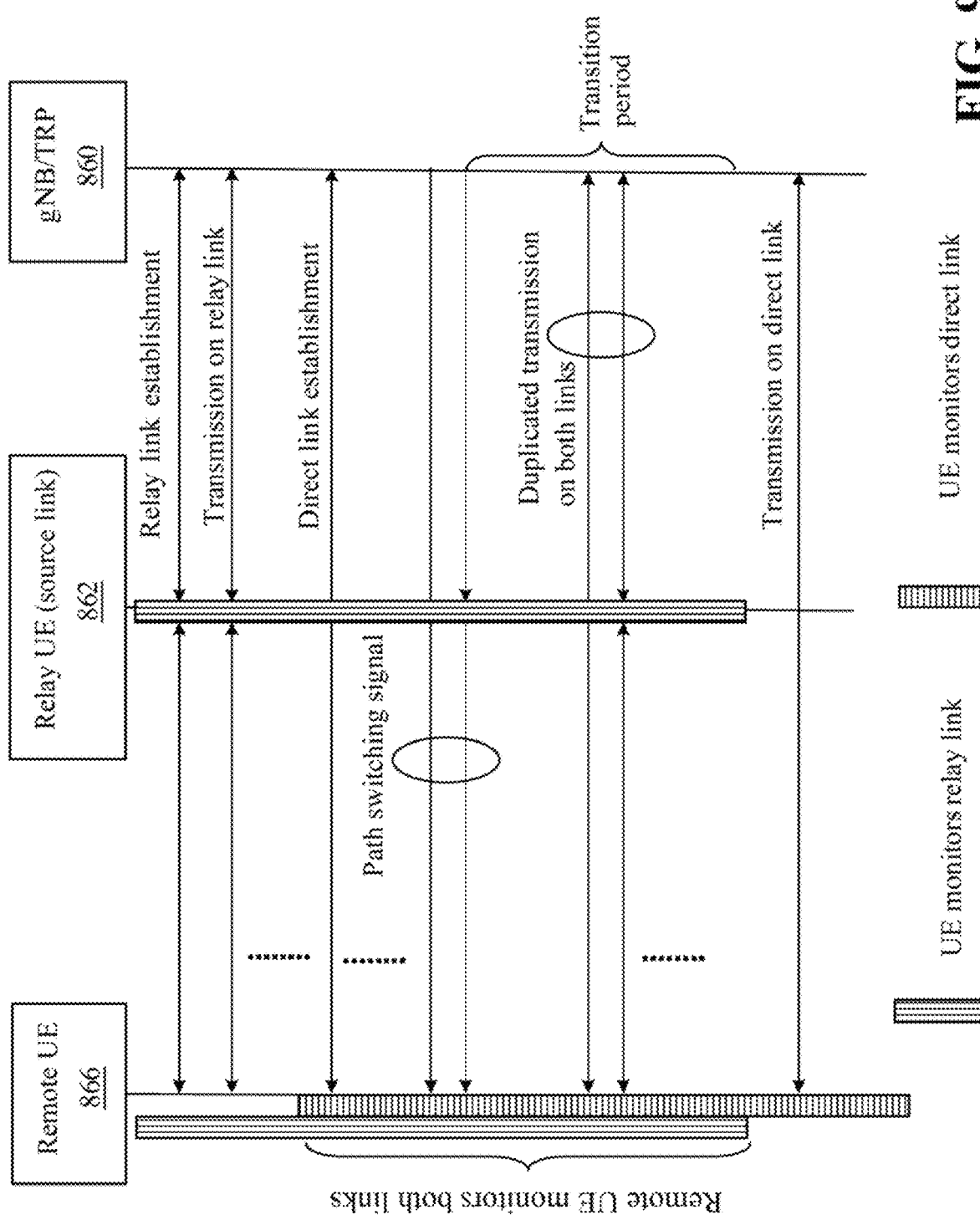

FIG. 9C illustrates an example timeline and signal/data flow for intra-gNB link switching from a source relay link to a target direct link. The example timeline and signal/data flow in FIG. 9C are generally similar to those in FIGS. 9A and 9B, but involve switching from a source relay link to a target direct link. Source link establishment involves signaling between the network device 860 and the source relay UE 862, and signaling between the source relay UE and the remote UE 866. After the source link has been established, data may be transmitted between the network device 860 and the remote UE 866 via the source relay UE 862. The target direct link is also established in FIG. 9C before any switching is initiated, using signaling between the network device 860 and the remote UE 866. As in other examples, the remote UE 866 may monitor both the source link and the target link after the target link is established, regardless of whether both the source link and the target link are used for data transmission or only the source link is used for data transmission.

A path switching signal is shown in FIG. 9C, as in other examples, as a form of switching signaling to initiate switching between links. Such signaling is transmitted to the remote UE 866 both through the source relay link via the source relay UE 862 and through the direct link in the example shown. During a transition period, duplicate data is transmitted on both the source link and the target link, and the remote UE 866 monitors both links for data. The remote UE 866 monitors only the target link, and data transmission between the network device 860 and the remote UE is over only the target link, after the transition period has elapsed.

Figure 9D:
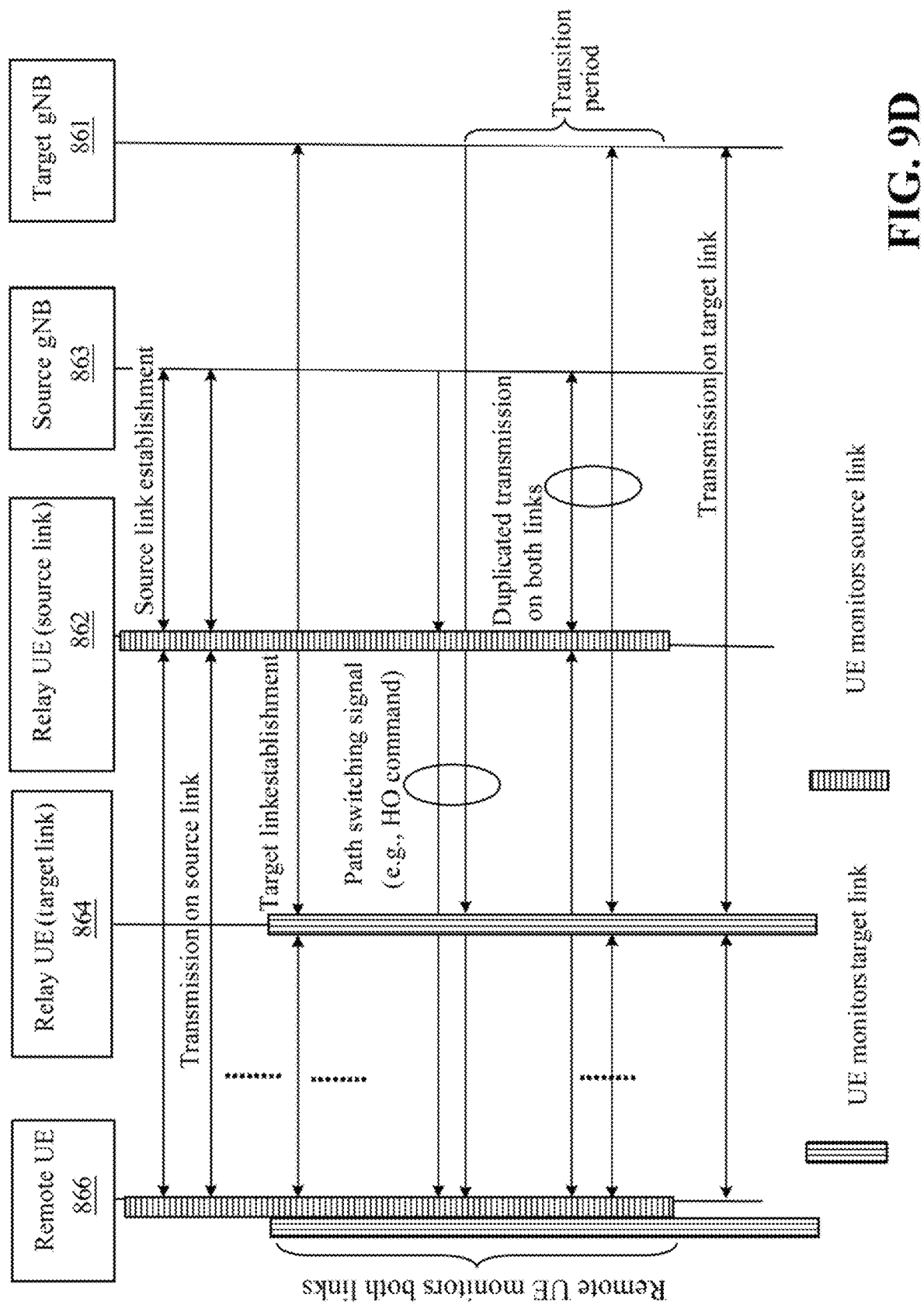

In FIG. 9D, an example timeline and signal/data flow for inter-gNB link switching from a source relay link to a target relay link is shown. This example is similar to the example shown in FIG. 9A, but involves two network devices. The network devices are shown as a target gNB 861 and a source gNB 863. UE behaviors of the relay UEs 862, 864 and the remote UE 866 are as described with reference to FIG. 9A, and network device behavior is also similar to that described with reference to FIG. 9A, with the exception that network device operations are split between the target gNB 861 and the source gNB 863 in FIG. 9D.

Figure 9E:
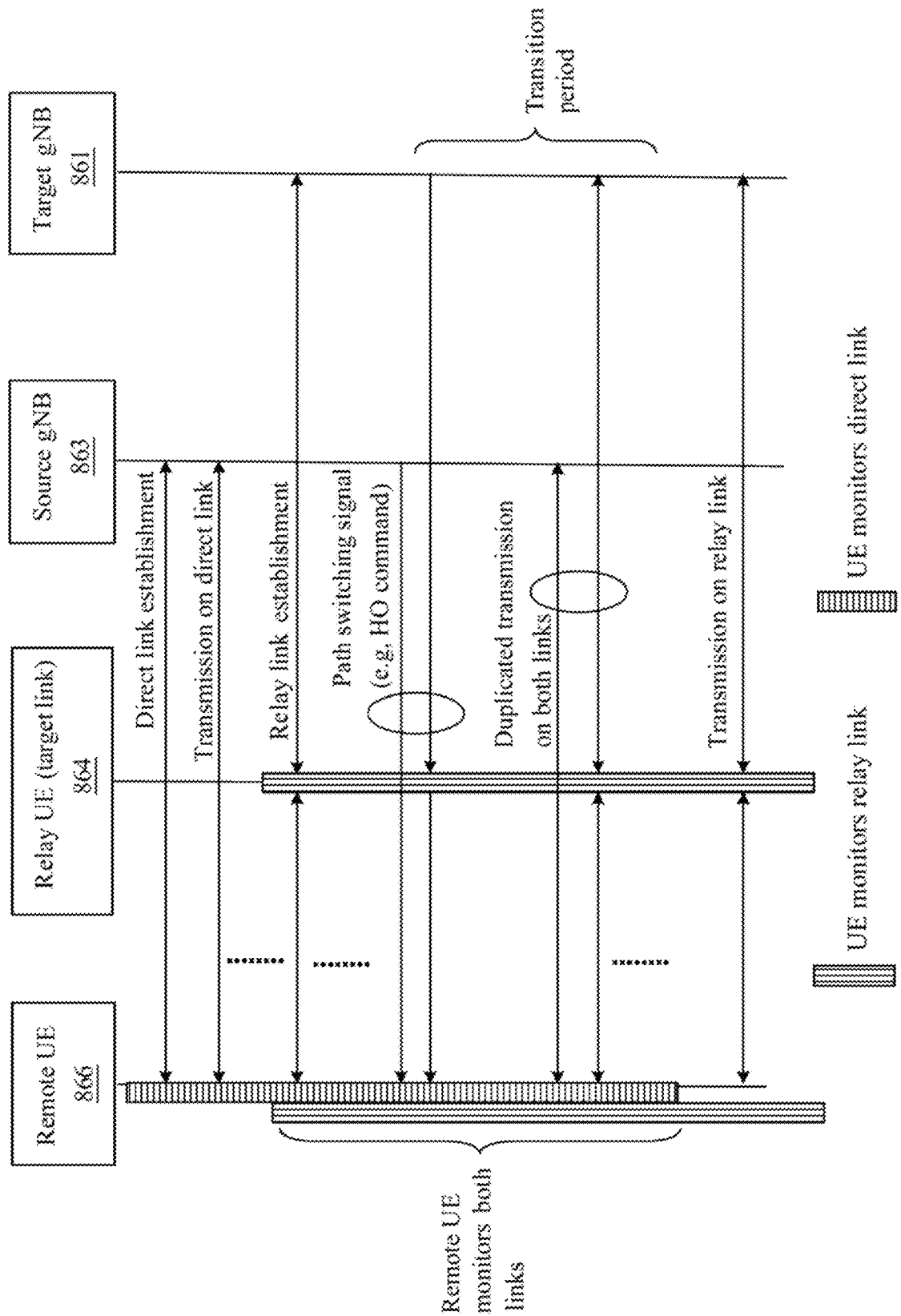

The example timeline and signal/data flow in FIG. 9E is for inter-gNB link switching from a source direct link to a target relay link, and is similar to the example in FIG. 9B except that network device operations are split between the target gNB 861 and the source gNB 863 in FIG. 9E. Similarly, the example timeline and signal/data flow in FIG. 9F for inter-gNB link switching from a source relay link to a target direct link is similar to the example in FIG. 9C.

Figure 9F:
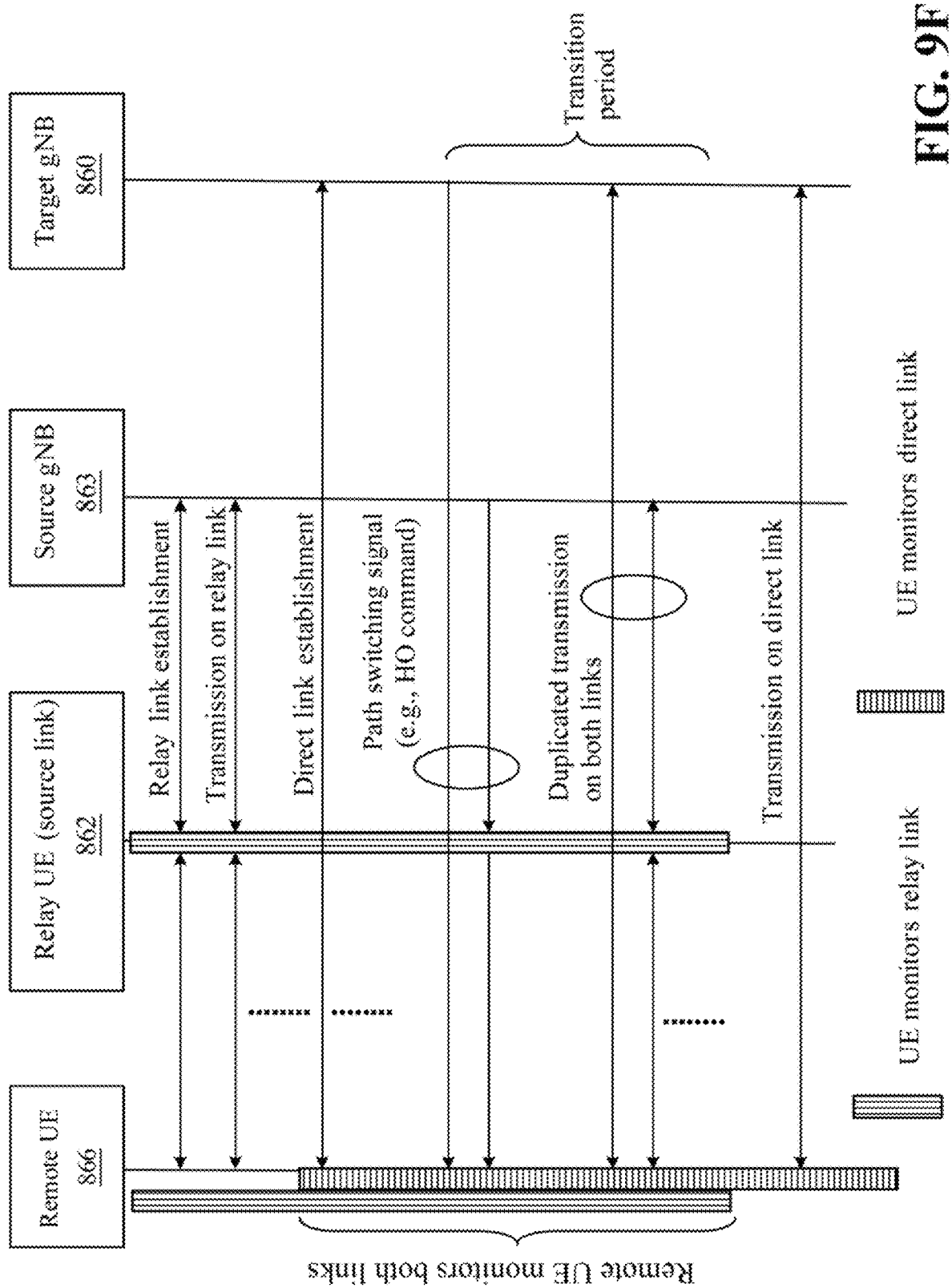

As in other examples, both the target link and the source link are established in FIGS. 9D to 9F before any switching is initiated, to enable fast switching between links, and between network devices in the inter-gNB link switching examples in FIGS. 9D to 9F.

For inter-gNB link switching (FIGS. 9D-9F), the path switching signal could be or be included in a handover (HO) command as shown. The HO command can be transmitted by source gNB 863 on the source link only, and could serve the purposes of both link switching from the source link to the target link and deactivation of the source link (possibly after a transition period).

The examples in FIGS. 8 and 9A to 9F are illustrative of various embodiments. These embodiments include, for example, a method related to remote UE behavior. Such a method may involve receiving signaling, such as a path switching message or a path switching signal as shown in FIGS. 8 and 9A to 9F, that includes an explicit indication that the UE is to switch between multiple communication links that have been established for communications with a wireless communication network before the signaling is received. The multiple established communication links include a first communication link and a second communication link, and in an embodiment the first communication link includes a relay link between the UE and the wireless communication network. The second communication link may be a direct communication link or another relay link. Examples with at least one relay link and at least one direct link, or multiple relay links without necessarily any direct links, are provided herein.

A method may also involve switching, by the UE responsive to the explicit indication, between the first communication link and the second communication link for communications with the wireless communication network.

In some embodiments, such as in the examples in FIGS. 9B, 9C, 9E, and 9F, receiving the signaling involves receiving the signaling from a network device with which the UE directly communicates. A remote UE may also or instead receive the signaling from a further UE (a relay UE) that is involved in the relay link, or each relay link in the case of multiple relay links such as in the examples in FIGS. 9A and 9D. In general, receiving signaling may involve receiving the signaling through any one or more of: the first communication link; the second communication link; and a further communication link between the UE and the wireless communication network.

The signaling that is received by a UE may include one or both of semi-static signaling and dynamic signaling, examples of which are provided elsewhere herein. Such signaling may be or include, for example, any one or more of: RRC signaling, MAC-CE signaling, DCI, SCI, header information, or the explicit indication carried by data.

Switching of communications between different links may take any of various forms. For example, considering first and second communication links, switching may be from one (also referred to herein as the source link) to the other (also referred to herein as the target link) of the first communication link and the second communication link. The explicit indication may be or include an explicit indication for switching from the one of the first communication link and the second communication link to the other of the first communication link and the second communication link.

Another example of the explicit indication is an explicit indication for deactivation of the one of the first communication link and the second communication link, from which communications are to be switched.

Signaling may include multiple indications. For example, signaling may include an explicit indication for switching from the one of the first communication link and the second communication link to the other of the first communication link and the second communication link, and the signaling may also include an explicit indication for deactivation of the one of the first communication link and the second communication link, which will not be used for communications after the switching is complete.

In some embodiments, the explicit indication in the received signaling is or includes an explicit indication for switching from the one to the other of the first communication link and the second communication link, and the method also involves receiving, by the UE, further signaling that includes a further explicit indication that the UE is to deactivate the one of the first communication link and the second communication link; and deactivating, by the UE responsive to the further explicit indication, the one of the first communication link and the second communication link. Separate signaling such as in this example may be useful to initiate and end a transition period.

A process of link switching or path switching may take any of various forms. A transition time period represents one example, in which switching involves maintaining communications with the wireless communication network through both the first communication link and the second communication link during the transition time period. Even though a switch of communications from one to the other of first and second communication links may be in progress responsive to received signaling for example, the switching may involve the remote UE monitoring both the first communication link and the second communication link during a transition time period, and subsequently monitoring only the other of the first communication link and the second communication link after the transition time period. This is shown in FIGS. 8 and 9A to 9F. As also shown by way of example in these drawings, before receiving the signaling the remote UE may be monitoring both the first communication link and the second communication link after they are established.

Put another way, in the context of a switch from one to the other of the first communication link and the second communication link, a method may involve the remote UE starting to monitor the other of the first communication link and the second communication link responsive to the explicit indication in the received signaling. Some embodiments may also or instead involve the remote UE stopping monitoring, of the one of the first communication link and the second communication link responsive to the explicit indication, or possibly after a transition time period.

The transition time period may be consistent with any one or more of: an indication of the transition time period provided in the received signaling, a time delay between receipt of the signaling and receipt of further signaling associated with deactivation of the first communication link or the second communication link; a predetermined time period; a time period between receipt of the signaling and expiry of a timer; and completion of a retransmission process that was initiated before the signaling was received.

Other features may also or instead be implemented, provided, or supported by a remote UE.

Embodiments also encompass relay UE features and behaviors. A method performed by a relay UE that is involved in a relay link between a wireless communication network and a second UE may include, for example, communicating, by the relay UE, signaling that is or includes an explicit indication that the second UE is to switch between the relay link and a second communication link for communications with the wireless communication network. The relay link, which may be considered a first communication link in this example, and the second communication link are multiple communication links established for communications between the wireless communication network and the second UE before the signaling is communicated by the relay UE. The second communication link may be another relay link or a direct link.

Such a method may also involve operating, by the relay UE, in a manner consistent with the switch between the first communication link and the second communication link by the second UE. The manner in which a relay UE operates after a switch depends upon whether the relay UE is a source relay UE on a source link or a target relay UE on a target link, or in other words whether communications are being switched to or away from the relay link.

Communicating the signaling by a relay UE may involve the relay UE receiving the signaling from a network device with which the second UE communicates through the relay link. The relay UE(s) in FIGS. 9A to 9F, for example, receive a path switching signal from one or more network devices in the example shown. Operating the relay UE in such embodiments may involve modifying operation of the relay UE responsive to the explicit indication that is provided by the received signaling.

Some embodiments may involve different types of signaling or indications between different elements or components. For example, a relay UE that receives signaling with an explicit indication from a network device may provide, to the second UE and responsive to the explicit indication, an implicit indication or an explicit indication that the second UE is to switch between the first communication link and the second communication link for communications with the wireless communication network. In this example, the relay UE receives the explicit indication, but may provide a different indication, including an implicit indication or an explicit indication, to the second UE.

In other embodiments, the relay UE receives the signaling and transmits the same type of signaling or indication, or even the same signaling or indication, to a remote UE.

The communicating of the signaling by the relay UE may involve the relay UE transmitting the signaling toward the second UE, as shown by way of example in FIGS. 9A to 9F in which the relay UE(s) transmit the path switching signal to the remote UE. A relay UE may transmit the signaling toward a remote UE by transmitting the signaling to the remote UE directly, or to another relay UE that is involved in a multi-hop relay link for instance.

Signaling may be transmitted by the relay UE responsive to any of various conditions or parameters. For example, a relay UE may determine that a link switch is to be performed, and transmit the signaling toward the remote UE responsive to that determination. In another embodiment, a relay UE receives an implicit indication or a further explicit indication that the second UE is to switch between the first communication link and the second communication link for communications with the wireless communication network. The communicating may then involve communicating the signaling by transmitting the signaling with the explicit indication toward the second UE, and the operating may involve modifying operation of the first UE responsive to the implicit indication or the further explicit indication received by the relay UE.

Any of various types of signaling may be communicated by a relay UE, including any one or more of: semi-static signaling, dynamic signaling, RRC signaling, MAC-CE signaling, DCI, SCI, header information, or the explicit indication carried by data.

An explicit indication that is communicated by a relay UE may similarly take any of various forms. For example, the explicit indication may be or include an explicit indication associated with switching from the first communication link to the second communication link. An indication associated with such switching may include, for example, a deactivation or release indication, because communications are being switched away from the first communication link in this example. In the event of such a switch, operating the relay UE may involve ceasing of monitoring over the first communication link for communication traffic that is associated with the second UE.

In another embodiment, the explicit indication may be or include an explicit indication associated with switching to the first communication link from the second communication link, which case operating the relay UE may involve starting of monitoring for communication traffic over the first communication link that is associated with the second UE.

Relay UE behavior or features may support a transition time period. For example, operating the relay UE in a manner consistent with the explicit indication may involve monitoring the first communication link for communication traffic that is associated with the second UE during a transition time period in which communication traffic is also communicated through the second communication link. Communication traffic may be duplicated on both links, or different communication traffic may be communicated over the first and second links. As an example of different communication traffic on the links, a transition time period may support completion of a HARQ process over a current link, and in that scenario one or more HARQ retransmissions may be made on the source link and new communication traffic may be communicated over the target link.

A transition time period may be consistent with any one or more of the following, for example: an indication of the transition time period provided in the signaling, a time delay between communication of the signaling and receipt of further signaling associated with deactivation of the first communication link; a predetermined time period; a time period between communication of the signaling and expiry of a timer; and completion of a retransmission process that was initiated before the signaling is communicated.

Other features may also or instead be implemented, provided, or supported by a relay UE.

Embodiments disclosed herein also encompass link switching control. For example, a method in accordance with a further aspect of the present disclosure involves determining whether a link switch condition is satisfied, and transmitting signaling to cause the link switching.

The link switch condition is a condition for a UE to switch between multiple communication links that were established for communications with a wireless communication network before the determining is performed. The multiple communication links include at least a first communication link and a second communication link, and at least the first communication link is a relay link between the UE and the wireless communication network. The second link, as in other embodiments, may be a direct link or another relay link.

The signaling to cause the UE to switch between the first communication link and the second communication link for communications with the wireless communication network is transmitted responsive to determining that the link switch condition is satisfied. In some embodiments, the signaling is or includes an explicit indication that the UE is to switch between the first communication link and the second communication link for communications with the wireless communication network.

Such a method may be performed or supported by a network device such as a gNB, or by another component such as a relay UE. A network device, for example, can determine when a switch is to take place based on measurements or feedback received from a remote UE.

In some embodiments, the determining involves determining, by a further UE that is involved in the relay link, that the UE is to switch between the first communication link and the second communication link for communications with the wireless communication network. A relay UE may receive measurements or feedback from a remote UE and make the switch determination. In another sense, a relay UE that receives switch or deactivation signaling from a network device may perform a type of determining based on receipt of that signaling, and then send further signaling toward a remote UE in some embodiments. More generally, the determining may be based on signaling received by a relay UE, and that received signaling may be or include an implicit indication or a further explicit indication that the UE is to switch between the links.

In some embodiments, link switching is transparent to a relay UE that is involved in the relay link.

Thus, a relay UE may or may not be involved in link switching control.

As disclosed herein, multiple links are established before switching is initiated. In some embodiments, a method also involves establishing the first communication link and the second communication link before the determining. This may involve one or more relay UEs. In some embodiments, link establishment is under control of a network device, as in the examples shown in FIGS. 9A to 9F for instance.

The signaling to cause the UE to switch between the links may be transmitted through any one or more of: the first communication link; the second communication link; and a further communication link between the UE and the wireless communication network. Examples of such signaling include the following, any one or more of which may be implemented or supported: semi-static signaling, dynamic signaling, RRC signaling, MAC-CE signaling, DCI, SCI, header information, or the explicit indication carried by data.

The explicit indication in the signaling that is transmitted responsive to determining that the link switch condition is satisfied may take any of various forms. As an example, the explicit indication may be or include an explicit indication for switching from one of the first communication link and the second communication link (also referred to herein as a source link) to the other of the first communication link and the second communication link (also referred to herein as a target link).

In an embodiment, the signaling is to cause the UE to switch from one of the first communication link and the second communication link to the other, and the explicit indication is or includes an explicit indication for deactivation of the one of the first communication link and the second communication link.

According to another embodiment, the explicit indication is or includes an explicit indication for switching from one of the first communication link and the second communication link to the other, and the signaling further includes an explicit indication for deactivation of the one of the first communication link and the second communication link.

In another scenario, the explicit indication is or includes an explicit indication for switching from one of the first communication link and the second communication link to the other, and a method also involves transmitting further signaling that is or includes a further explicit indication that the UE is to deactivate the one of the first communication link and the second communication link.

Other features may also or instead be implemented, provided, or supported in such methods.

For example, a method may involve maintaining communications between the UE and the wireless communication network through both the first communication link and the second communication link during a transition time period. Consider an embodiment in which the explicit indication is or includes an explicit indication for switching from one of the first communication link and the second communication link to the other. A method may involve such operations as duplicating data for the UE on both the first communication link and the second communication link during a transition time period, or transmitting different data on the first communication link and the second communication link during the transition time period. Such a transition time period may be consistent with any one or more of: an indication of the transition time period provided in the signaling, a time delay between the transmitting of the signaling and transmitting of further signaling associated with deactivation of the first communication link or the second communication link; a predetermined time period; a time period between transmitting of the signaling and expiry of a timer; and completion of a retransmission process that was initiated before the transmitting.

Embodiments are described above primarily in the context of example methods. Other embodiments are also possible.

Figure 10A:
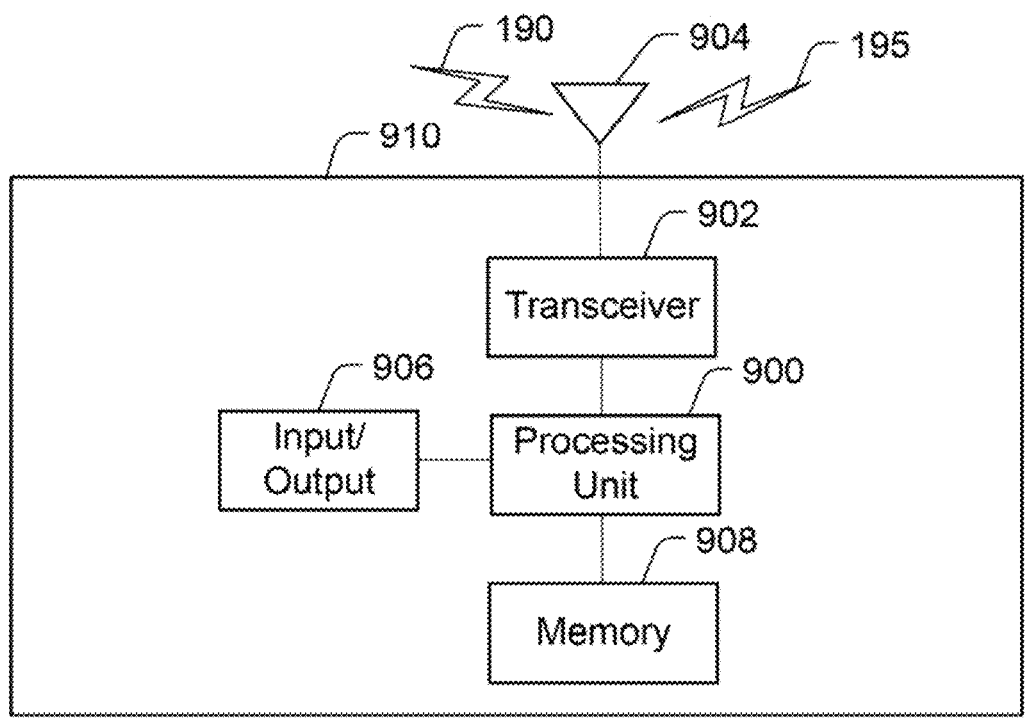
FIGS. 10A and 10B are block diagrams illustrating example devices that may implement the methods and teachings according to this disclosure.
Figure 10B:
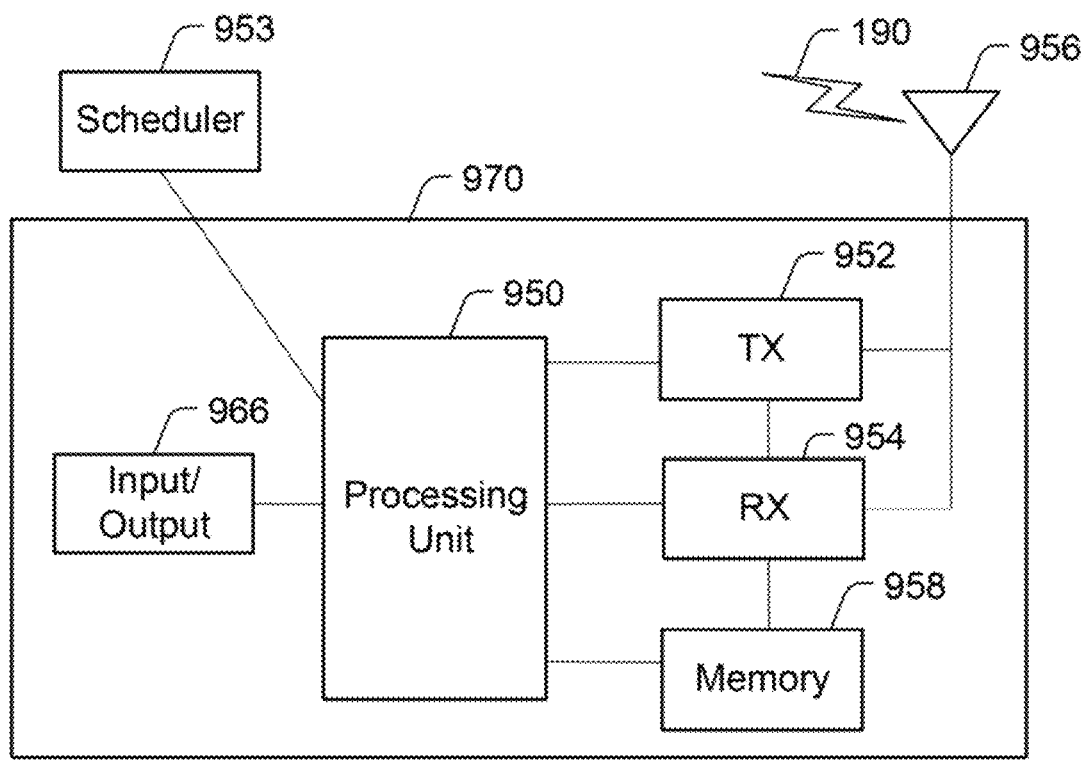

See, for example, FIGS. 10A and 10B which illustrate example devices that may implement the methods and teachings according to this disclosure.

FIG. 10A illustrates an example ED 910, and FIG. 10B illustrates an example base station 970. These components could be used in the system 100 (FIG. 1) or in any other suitable system.

As shown in FIG. 10A, the ED 910 includes at least one processing unit 900. The processing unit 900 implements various processing operations of the ED 910. For example, the processing unit 900 could perform signal coding, data processing, power control, input processing, output processing, or any other functionality enabling the ED 910 to operate in a communication system. The processing unit 900 may also be configured to implement some or all of the functionality or embodiments described in more detail herein. Each processing unit 900 includes any suitable processing or computing device configured to perform one or more operations. Each processing unit 900 could, for example, include a microprocessor, microcontroller, digital signal processor, field programmable gate array, or application specific integrated circuit.

The ED 910 also includes at least one transceiver 902. The transceiver 902 is configured to modulate data or other content for transmission by at least one antenna or NIC (Network Interface Controller) 904. The transceiver 902 is also configured to demodulate data or other content received by the at least one antenna 904. Each transceiver 902 includes any suitable structure for generating signals for wireless transmission and/or processing signals received wirelessly or by wire. Each antenna 904 includes any suitable structure for transmitting and/or receiving wireless signals. One or multiple transceivers 902 could be used in the ED 910, and one or multiple antennas 904 could be used in the ED 910. Although shown as a single functional unit, a transceiver 902 could be implemented using at least one transmitter and at least one separate receiver.

The ED 910 further includes one or more input/output devices 906 or interfaces. The input/output devices 906 facilitate interaction with a user or other devices (network communications) in the network. Each input/output device 906 includes any suitable structure for providing information to or receiving/providing information from a user, such as a speaker, microphone, keypad, keyboard, display, or touch screen, including network interface communications.

In addition, the ED 910 includes at least one memory 908. The memory 908 stores instructions and data used, generated, or collected by the ED 910. For example, the memory 908 could store software instructions or modules configured to implement some or all of the functionality or embodiments described above and that are executed by the processing unit(s) 900. Each memory 908 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 970 includes at least one processing unit 950, at least one transmitter 952, at least one receiver 954, one or more antennas 956, at least one memory 958, and one or more input/output devices or interfaces 966. A transceiver, not shown, may be used instead of the transmitter 952 and receiver 954. A scheduler 953 may be coupled to the processing unit 950. The scheduler 953 may be included within or operated separately from the base station 970. The processing unit 950 implements various processing operations of the base station 970, such as signal coding, data processing, power control, input processing, output processing, or any other functionality. The processing unit 950 can also be configured to implement some or all of the functionality or embodiments described in more detail herein. Each processing unit 950 includes any suitable processing or computing device configured to perform one or more operations. Each processing unit 950 could, for example, include a microprocessor, microcontroller, digital signal processor, field programmable gate array, or application specific integrated circuit.

Each transmitter 952 includes any suitable structure for generating signals for wireless transmission to one or more EDs or other devices. Each receiver 954 includes any suitable structure for processing signals received wirelessly or by wire from one or more EDs or other devices. Although shown as separate components, at least one transmitter 952 and at least one receiver 954 could be combined into a transceiver. Each antenna 956 includes any suitable structure for transmitting, receiving, or both transmitting and receiving wireless signals. While a common antenna 956 is shown here as being coupled to both the transmitter 952 and the receiver 954, one or more antennas 956 could be coupled to the transmitter(s) 952, and one or more separate antennas 956 could be coupled to the receiver(s) 954. Each memory 958 includes any suitable volatile and/or non-volatile storage and retrieval device(s) such as those described above in connection to the ED 910. The memory 958 stores instructions and data used, generated, or collected by the base station 970. For example, the memory 958 could store software instructions or modules configured to implement some or all of the functionality or embodiments described herein and that are executed by the processing unit(s) 950.

Each input/output device 966 facilitates interaction with a user or other devices (network communications) in the network. Each input/output device 966 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 908 and the memory 958, for example, could include one or more physical memory devices. Solid-state memory devices such as a Flash memory device could be implemented. Memory devices with movable or even removable storage media could also or instead be implemented.

FIG. 10A and FIG. 10B illustrate examples of a UE and network equipment, respectively, in which embodiments could be implemented. More generally, an apparatus may include a processor and a non-transitory computer readable storage medium, such as the processing unit 900, 950 and memory 908, 958 in FIG. 10A or FIG. 10B. Such an apparatus may be a UE, including a relay UE, a source UE, a destination UE, a helping remote UE, or a remote UE. Another example of an apparatus is network equipment, which may be a gNB, a TRP, a base station, or any other type of network equipment referenced herein. Other components, such as a communication interface to which the processor is coupled, may also be provided. Elements 902, 904, 952, 954, 956 in FIGS. 10A and 10B are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the apparatus is a UE and the programming includes instructions to cause a processor in the UE to receive signaling comprising an explicit indication that the UE is to switch between multiple communication links established for communications with a wireless communication network before the signaling is received, and to switch, responsive to the explicit indication, between communication links for communications with the wireless communication network. The multiple communication links include a first communication link and a second communication link, and at least the first communication link is or includes a relay link between the UE and the wireless communication network.

Some embodiments include any one or more of the following features, in any of various combinations:
the instructions cause the processor to receive the signaling from a network device with which the UE directly communicates through the second communication link;
the instructions cause the processor to receive the signaling from a further UE that is involved in the relay link;
the instructions cause the processor to receive the signaling through any one or more of: the first communication link; the second communication link; and a further communication link between the UE and the wireless communication network;
the second communication link is or includes a further relay link between the UE and the wireless communication network;
the signaling is or includes one or both of: semi-static signaling and dynamic signaling;
the signaling is or includes any one or more of: RRC signaling, MAC-CE signaling, DCI, SCI, header information, or the explicit indication carried by data;
the instructions cause the processor to switch from one of the first communication link and the second communication link to the other of the first communication link and the second communication link for communications with the wireless communication network;
the explicit indication is or includes an explicit indication for switching from the one of the first communication link and the second communication link to the other of the first communication link and the second communication link;
the explicit indication is or includes an explicit indication for deactivation of the one of the first communication link and the second communication link;
the signaling further includes an explicit indication for deactivation of the one of the first communication link and the second communication link;
the instructions cause the processor to receive further signaling that includes a further explicit indication that the UE is to deactivate the one of the first communication link and the second communication link;
the instructions cause the processor to deactivate, responsive to the further explicit indication, the one of the first communication link and the second communication link;
the instructions cause the processor to maintain communications with the wireless communication network through both the first communication link and the second communication link during a transition time period;
the instructions cause the processor to start to monitor, responsive to the explicit indication, the other of the first communication link and the second communication link;
the instructions cause the processor to stop monitoring, responsive to the explicit indication or after a transition time period, of the one of the first communication link and the second communication link;
the transition time period is consistent with any one or more of: an indication of the transition time period provided in the received signaling, a time delay between receipt of the signaling and receipt of further signaling associated with deactivation of the first communication link or the second communication link; a predetermined time period; a time period between receipt of the signaling and expiry of a timer; and completion of a retransmission process that was initiated before the signaling is received;
the instructions cause the processor to monitor, before receiving the signaling, both the first communication link and the second communication link after they are established.

In another apparatus embodiment, the apparatus is a first UE involved in a relay link that comprises a first communication link between a wireless communication network and a second UE, and the programming includes instructions to cause a processor in the first UE to: communicate signaling that is or includes an explicit indication that the second UE is to switch between the first communication link and a second communication link for communications with the wireless communication network; and operate in a manner consistent with the switch between the first communication link and the second communication link by the second UE. The first communication link and the second communication link are multiple communication links established for communications between the wireless communication network and the second UE before the signaling is communicated.

Some embodiments include any one or more of the following features, in any of various combinations:
the instructions cause the processor to communicate the signaling by receiving the signaling from a network device with which the second UE communicates through the first communication link;
the instructions cause the processor to operate by modifying operation of the first UE responsive to the explicit indication;
the programming further includes instructions to cause the processor to provide, to the second UE and responsive to the explicit indication, an implicit indication or an explicit indication that the second UE is to switch between the first communication link and the second communication link for communications with the wireless communication network;
the instructions cause the processor to communicate the signaling by transmitting the signaling toward the second UE;
the programming further includes instructions to cause the processor to receive an implicit indication or a further explicit indication that the second UE is to switch between the first communication link and the second communication link for communications with the wireless communication network;
the instructions cause the processor to operate by modifying operation of the first UE responsive to the implicit indication or the further explicit indication received by the first UE;
the signaling is or includes one or both of: semi-static signaling and dynamic signaling;
the signaling is or includes any one or more of: RRC signaling, MAC-CE signaling, DCI, SCI, header information, or the explicit indication carried by data;

the explicit indication is or includes an explicit indication associated with switching from the first communication link to the second communication link:

the instructions cause the processor to operate by ceasing of monitoring for communication traffic over the first communication link that is associated with the second UE;

the explicit indication comprises an explicit indication associated with switching to the first communication link from the second communication link;

the instructions cause the processor to operate by starting of monitoring for communication traffic over the first communication link that is associated with the second UE;

the instructions cause the processor to operate by monitoring the first communication link for communication traffic that is associated with the second UE during a transition time period in which communication traffic is communicated through the second communication link;

the transition time period is consistent with any one or more of: an indication of the transition time period provided in the signaling, a time delay between communication of the signaling and receipt of further signaling associated with deactivation of the first communication link; a predetermined time period; a time period between communication of the signaling and expiry of a timer; and completion of a retransmission process that was initiated before the signaling is communicated.

In another apparatus embodiment, the programming includes instructions to cause a processor to determine whether a link switch condition is satisfied, the link switch condition comprising a condition for a UE to switch between multiple communication links established for communications with a wireless communication network before the determining. The multiple communication links include a first communication link and a second communication link, and at least the first communication link is or includes a relay link between the UE and the wireless communication network. The programming also includes instructions to cause the processor to transmit, responsive to determining that the link switch condition is satisfied, signaling to cause the UE to switch between the first communication link and the second communication link for communications with the wireless communication network. The signaling is or includes an explicit indication that the UE is to switch between the first communication link and the second communication link for communications with the wireless communication network.

Some embodiments include any one or more of the following features, in any of various combinations:

the apparatus comprises a further UE that is involved in the relay link;

the instructions cause the processor to determine whether the link switch condition is satisfied based on an implicit indication or a further explicit indication received by the further UE;

the instructions cause the processor to, before determining whether the link switch condition is satisfied, establish the first communication link and the second communication link;

the instructions cause the processor to transmit the signaling through any one or more of: the first communication link; the second communication link; and a further communication link between the UE and the wireless communication network;

the signaling is or includes one or both of: semi-static signaling and dynamic signaling;

the signaling is or includes any one or more of: RRC signaling, MAC-CE signaling, DCI, SCI, header information, or the explicit indication carried by data;

the explicit indication is or includes an explicit indication for switching from the one of the first communication link and the second communication link to the other of the first communication link and the second communication link;

the signaling is to cause the UE to switch from one of the first communication link and the second communication link to the other of the first communication link and the second communication link for communications with the wireless communication network;

the explicit indication is or includes an explicit indication for deactivation of the one of the first communication link and the second communication link;

the signaling further includes an explicit indication for deactivation of the one of the first communication link and the second communication link;

the instructions cause the processor to transmit further signaling that includes a further explicit indication that the UE is to deactivate the one of the first communication link and the second communication link;

the instructions cause the processor to maintain communications between the UE and the wireless communication network through both the first communication link and the second communication link during a transition time period;

the transition time period is consistent with any one or more of: an indication of the transition time period provided in the signaling, a time delay between the transmitting of the signaling and transmitting of further signaling associated with deactivation of the first communication link or the second communication link; a predetermined time period; a time period between transmitting of the signaling and expiry of a timer; and completion of a retransmission process that was initiated before the transmitting.

Other features that could be implemented in apparatus embodiments could be or become apparent, for example, from the method embodiments disclosed herein.

Figure 11:
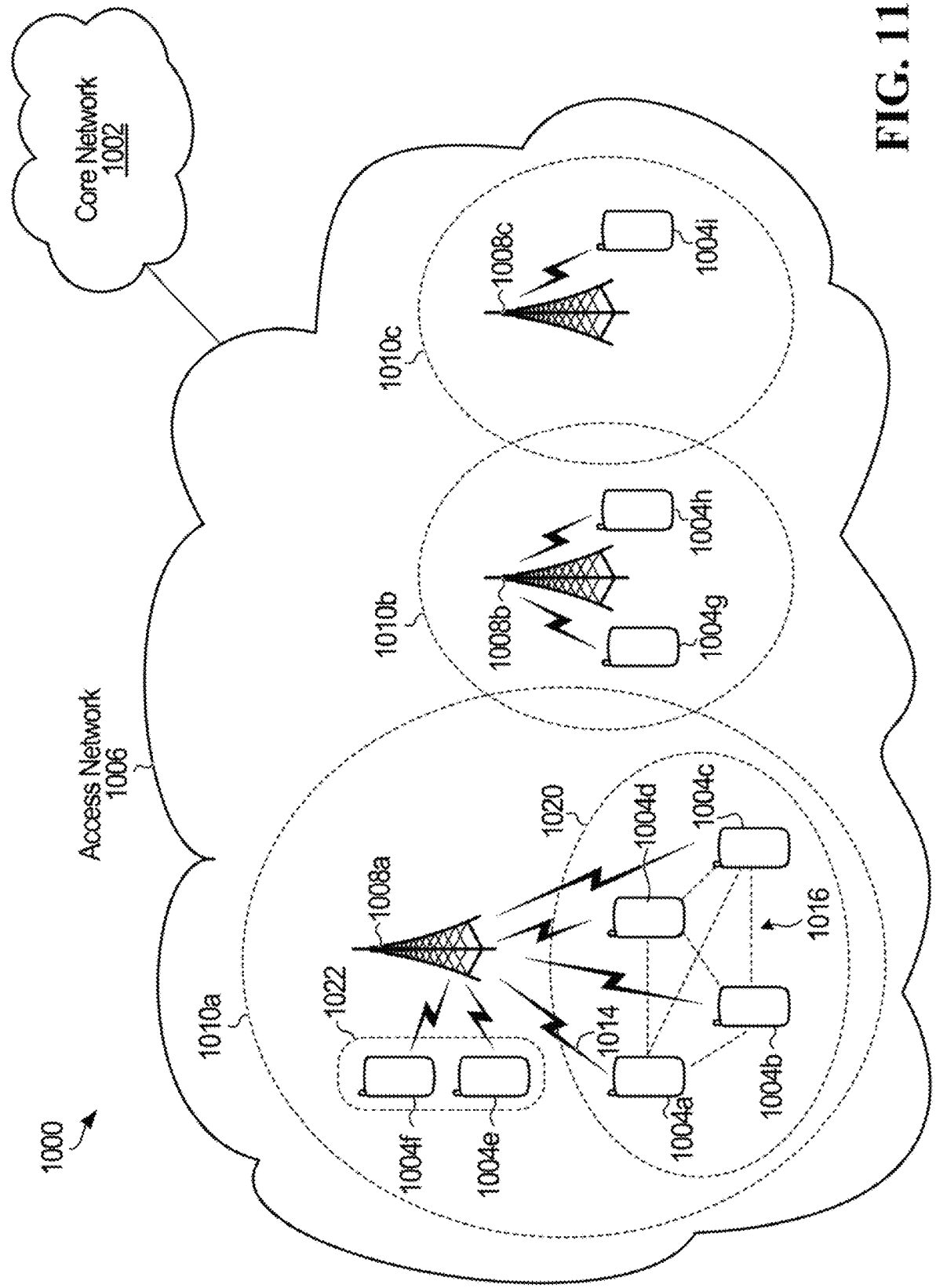
FIG. 11 is a block diagram illustrating an example of a telecommunications network according to one embodiment.

FIG. 11 is a block diagram illustrating an example of a telecommunications network 1000 according to one embodiment. The telecommunications network 1000 includes a core network 1002 and an access network 1006. The access network 1006 serves a plurality of UEs 1004a, 1004b, 1004c, 1004d, 1004e, 1004f, 1004g, 1004h, and 1004i. The access network 1006 is an Evolved Universal Terrestrial Access (E-UTRA) network in some embodiments. Another example of an access network 1006 is a cloud access network (C-RAN). The access network 1006 includes a plurality of BSs 1008a, 1008b, and 1008c. The BSs 1008a-c each provide a respective wireless coverage area 1010a, 1010b, and 1010c, also referred to as a cell. Each of the BSs 1008a-c could be implemented using a radio transceiver, one or more antennas, and associated processing circuitry, such as antenna radio frequency (RF) circuitry, one or more analog-to-digital converters, one or more digital-to-analog converters, etc.

Although not illustrated, the BSs 1008a-c are each connected to the core network 1002, either directly or through one or more central processing hubs, such as servers. The BSs 1008a-c could serve as a gateway between the wireline and wireless portion of the access network 1006.

Each one of BSs 1008*a-c* may instead be referred to as a base transceiver station, a radio BS, a network node, a transmit node, a transmit point, a Node B, an eNode B, a remote radio head (RRH), or otherwise, depending upon the implementation.

In operation, the plurality of UEs 1004*a-i* access the telecommunications network 1000 using the access network 1006 by wirelessly communicating with one or more of the BSs 1008*a-c*.

UEs 1004*a-d* are in close proximity to each other. Although the UEs 1004*a-d* can each wirelessly communicate with the BS 1008*a*, they can also directly communicate with each other, as represented at 1016. The communications represented at 1016 are direct communications between UEs, such as sidelink communications as disclosed herein, that do not go through an access network component, such as a BS. As shown in FIG. 11, UE to UE communications 1016 are directly between the UEs 1004*a-d* and are not routed through the BS 1008*a*, or any other part of the access network 1006. Communications 1016 may also be referred to as lateral communications. In embodiments disclosed herein, UE to UE communications use a sidelink channel and a sidelink air interface. On the other hand, a communication between an access network component, such as BS 1008*a*, and a UE, as in communication 1014, is called an access communication. An access communication occurs over an access channel, which can be a uplink or downlink channel, and an access communication uses a radio access communication interface, such as a cellular radio access air interface. Access and sidelink air interfaces may use different transmission formats, such as different waveforms, different multiple access schemes, or different radio access technologies. Some examples of radio access technologies that could be used by an access air interface or a sidelink air interface are: Long Term Evolution (LTE), LTE License Assisted Access (LTE-LAA), and WiFi.

By using the sidelink communications 1016, the UEs 1004*a-d* may be able to assist with wireless communications between the UEs 1004*a-d* and the BS 1008*a*. As one example, if UE 1004*c* fails to correctly decode a packet received from the BS 1008*a* but UE 1004*d* is able to receive and correctly decode the packet from the BS 1008*a*, then UE 1004*d* could directly transmit the decoded packet to UE 1004*c* using sidelink communications 1016. As another example, if UE 1004*c* moves out of wireless coverage area 1010*c*, such that UE 1004*c* can no longer wirelessly communicate with the BS 1008*a*, then UE 1004*b* could forward messages between the UE 1004*c* and the BS 1008*a*. As another example, UE 1004*a* and UE 1004*c* could both receive a signal transmitted from the BS 1008*a* that carries a packet meant for UE 1004*c*. UE 1004*a* may then transmit to UE 1004*c*, via sidelink communications 1016, the signal as received by UE 1004*a*. UE 1004*c* may then use the information received from UE 1004*a* to help decode the packet from the BS 1008*a*. In these examples, capacity or coverage may be enhanced through the assistance of one or more of the UEs 1004*a*, 1004*b*, and 1004*d*.

The UEs 1004*a-d* form a UE group 1020 in some embodiments. It should be noted, however, that relay links as disclosed herein are not dependent upon UE groups.

The access network 1006 could assign a group identifier (ID) to the UE group 1020. The UE group ID may allow the access network 1006 to address the UE group 1020 as a whole and distinguish the UE group 1020 from other UE groups. The UE group ID may also be used to broadcast information within the UE group; that is, address all other UEs within the UE group 1020. The UE group 1020 may form a logical or virtual device mesh in which the members of the UE group 1020 communicate amongst themselves using UE communications over a sidelink air interface, but the UE group 1020 as a whole acts as a single distributed virtual transceiver with respect to the access network 1006. The UE group ID may be a group radio network temporary identifier (G-RNTI), for example.

When a particular UE in the UE group 1020, such as the UE 1004*c*, is being assisted or is to be assisted with wireless communication between that UE and the BS 1008*a*, then the other UEs 1004*a*, 1004*b*, and 1004*d* in the group 1020 may be considered candidates to be a relay UE or a helping UE. In a group-based embodiment, the subset of UEs that assist the UE 1004*c* form a cooperation active set or a cooperation group. The cooperation active set may be dynamically selected to assist the UE 1004*c*.

In UE group 1020, UEs 1004*a*, 1004*b*, and 1004*d* form a cooperation candidate set. If UEs 1004*a* and 1004*b* assist the UE 1004*c*, then the UEs 1004*a* and 1004*b* form the cooperation active set. As UEs 1004*a-d* move around, some may leave the UE group 1020. UE movement may also or instead result in other UEs joining the UE group 1020. Therefore, the cooperation candidate set may change over time. For example, the cooperation candidate set may change semi-statically. The UE group 1020 may also be terminated by the network 1006, for example, if the network determines that there is no longer a need or opportunity for the UE group 1020 to provide assistance in wireless communication between the BS 908*a* and members of the UE group 1020.

There may be more than one UE group. For example, UEs 1004*e* and 1004*f* in FIG. 11 form another UE group 1022.

Figure 12:
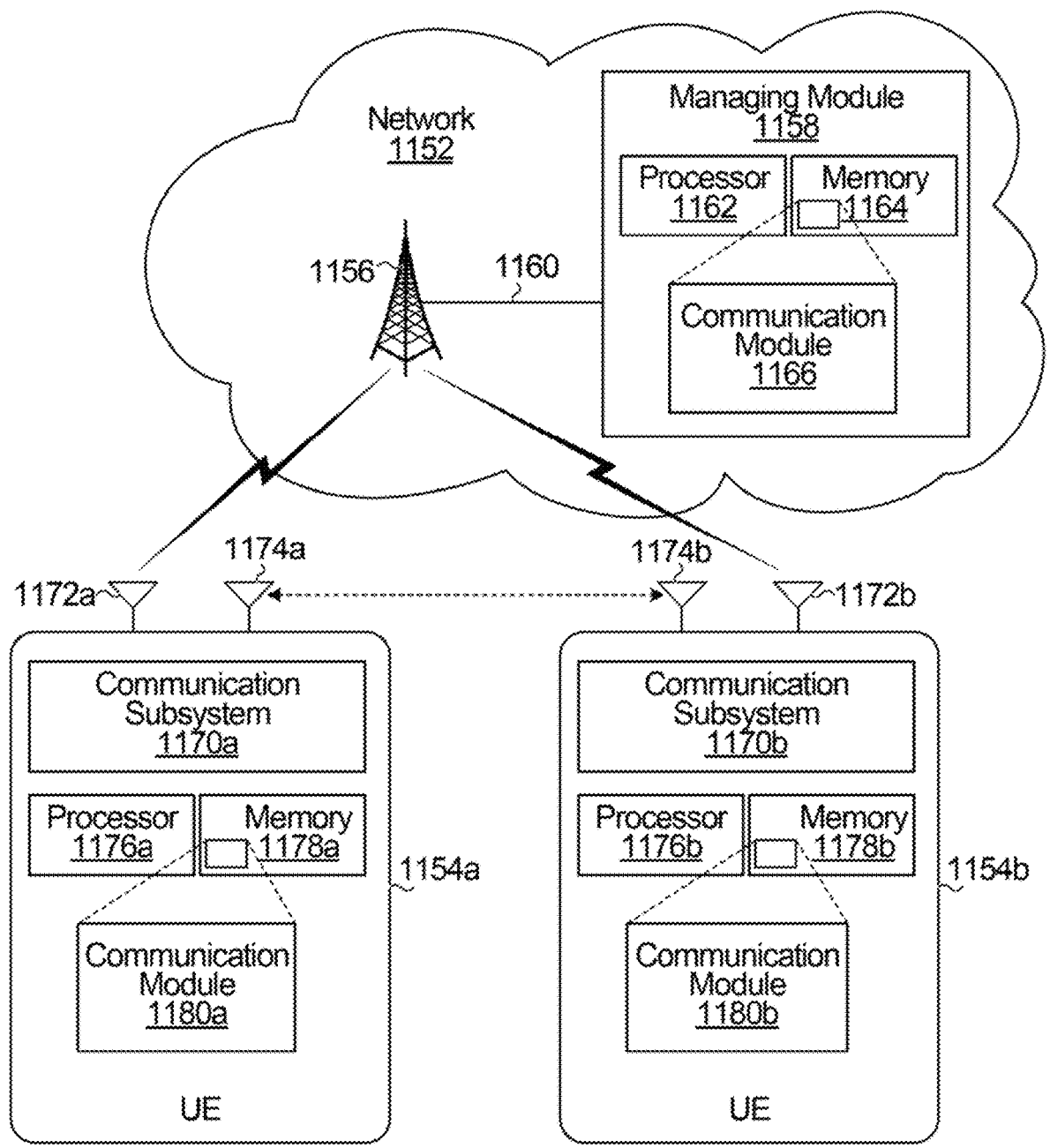
FIG. 12 is a block diagram illustrating an example of a network serving two UEs.

FIG. 12 is a block diagram illustrating an example of a network 1152 serving two UEs 1154*a* and 1154*b*, according to one embodiment. The network 1152 may be the access network 1006 from FIG. 11, and the two UEs 1154*a* and 1154*b* may be two of the four UEs 1004*a-d* in FIG. 11, or the UEs 1154*a* and 1154*b* may be UEs 1004*e* and 1004*f* in FIG. 11. However, more generally this need not be the case, which is why different reference numerals are used in FIG. 12.

The network 1152 includes a BS 1156 and a managing module 1158. The managing module 1158 instructs the BS 1156 to perform actions. The managing module 1158 is illustrated as physically separate from the BS 1156 and coupled to the BS 1156 via a communication link 1160. For example, the managing module 1158 may be part of a server in the network 1152. Alternatively, the managing module 1158 may be part of the BS 1156.

The managing module 1158 includes a processor 1162, a memory 1164, and a communication module 1166. The communication module 1166 is implemented by the processor 1162 when the processor 1162 accesses and executes a series of instructions stored in the memory 1164, the instructions defining the actions of the communication module 1166. When the instructions are executed, the communication module 1166 causes the BS 1156 to perform the actions described herein so that the network 1152 can establish, coordinate, instruct, or control relay, and possibly perform such operations in respect of UE groups. Alternatively, the communication module 1166 may be implemented using dedicated circuitry, such as an application specific integrated circuit (ASIC) or a programmed field programmable gate array (FPGA).

The UE 1154*a* includes a communication subsystem 1170*a*, two antennas 1172*a* and 1174*a*, a processor 1176*a*, and a memory 1178*a*. The UE 1154*a* also includes a communication module 1180*a*. The communication module 1180a is implemented by the processor 1176a when the processor 1176a accesses and executes a series of instructions stored in the memory 1178a, the instructions defining the actions of the communication module 1180a. When the instructions are executed, the communication module 1180a causes the UE 1154a to perform actions described herein in relation to one or more of a relay UE, a helping UE, and a remote UE. Features related to establishing and participating in a UE group may also be supported. Alternatively, the module 1180a may be implemented by dedicated circuitry, such as an ASIC or an FPGA.

The communication subsystem 1170a includes processing circuitry, transmit circuitry, and receive circuitry for sending messages from and receiving messages at the UE 1154a. Although one communication subsystem 1170a is illustrated, the communication subsystem 1170a may be multiple communication subsystems. Antenna 1172a transmits wireless communication signals to, and receives wireless communications signals from, the BS 1156. Antenna 1174a transmits sidelink communication signals to, and receives sidelink communication signals from, other UEs, including UE 1154b. In some implementations there may not be two separate antennas 1172a and 1174a. A single antenna may be used. Alternatively, there may be several antennas, but not separated into antennas dedicated only to sidelink communication and antennas dedicated only to communicating with the BS 1156.

SL communications could be over Wi-Fi, in which case the antenna 1174a may be a Wi-Fi antenna. Alternatively, the sidelink communications could be over Bluetooth™, in which case the antenna 1174a may be a Bluetooth™ antenna. Sidelink communications could also or instead be over licensed or unlicensed spectrum.

The UE 1154b includes the same components described above with respect to the UE 1154a. That is, UE 1154b includes communication subsystem 1170b, antennas 1172b and 1174b, processor 1176b, memory 1178b, and communication module 1180b.

FIGS. 11 and 12 illustrate systems in which embodiments could be implemented. In some embodiments, a UE includes a processor, such as 1176a, 1176b in FIG. 12, and a non-transitory computer readable storage medium, such as 1178a, 1178b in FIG. 12, storing programming for execution by the processor. A non-transitory computer readable storage medium could also or instead be provided separately, as a computer program product. Examples are provided elsewhere herein.

Embodiments disclosed herein encompass, among others, the examples below.

An example 1 relates to a method comprising: receiving, by a UE, signaling comprising an explicit indication that the UE is to switch between multiple communication paths established for communications with a wireless communication before the signaling is received, the multiple communication paths comprising a first communication path and a second communication path, the first communication path comprising a relay path between the UE and the wireless communication network; switching, by the UE responsive to the explicit indication, between the first communication path and the second communication path for communications with the wireless communication network.

An example 2 relates to the method of example 1, wherein the receiving comprises receiving the signaling from a network device with which the UE directly communicates through the second communication path.

An example 3 relates to the method of example 1 or example 2, wherein the receiving comprises receiving the signaling from a further UE that is involved in the relay path.

An example 4 relates to the method of example 1, wherein the receiving comprises receiving the signaling through any one or more of: the first communication path; the second communication path; and a further communication path between the UE and the wireless communication network.

An example 5 relates to the method of example 1, wherein the second communication path comprises a further relay path between the UE and the wireless communication network.

An example 6 relates to the method of any one of examples 1 to 5, wherein the signaling comprises one or both of: semi-static signaling and dynamic signaling.

An example 7 relates to the method of example 6, wherein the signaling comprises any one or more of: RRC signaling, MAC-CE signaling, DCI, SCI, header information, or the explicit indication carried by data.

An example 8 relates to the method of any one of examples 1 to 7, wherein the switching comprises switching from one of the first communication path and the second communication path to the other of the first communication path and the second communication path for communications with the wireless communication network, wherein the explicit indication comprises an explicit indication for switching from the one of the first communication path and the second communication path to the other of the first communication path and the second communication path.

An example 9 relates to the method of any one of examples 1 to 7, wherein the switching comprises switching from one of the first communication path and the second communication path to the other of the first communication path and the second communication path for communications with the wireless communication network, wherein the explicit indication comprises an explicit indication for deactivation of the one of the first communication path and the second communication path.

An example 10 relates to the method of any one of examples 1 to 7, wherein the switching comprises switching from one of the first communication path and the second communication path to the other of the first communication path and the second communication path for communications with the wireless communication network, wherein the explicit indication comprises an explicit indication for switching from the one of the first communication path and the second communication path to the other of the first communication path and the second communication path, wherein the signaling further comprises an explicit indication for deactivation of the one of the first communication path and the second communication path.

An example 11 relates to the method of any one of examples 1 to 7, wherein the switching comprises switching from one of the first communication path and the second communication path to the other of the first communication path and the second communication path for communications with the wireless communication network, wherein the explicit indication comprises an explicit indication for switching from the one of the first communication path and the second communication path to the other of the first communication path and the second communication path, wherein the method further comprises: receiving, by the UE, further signaling that comprises a further explicit indication that the UE is to deactivate the one of the first communication path and the second communication path; deactivating, by the UE responsive to the further explicit indication, the one of the first communication path and the second communication path.

An example 12 relates to the method of any one of examples 1 to 11, wherein the switching comprises maintaining communications with the wireless communication network through both the first communication path and the second communication path during a transition time period.

An example 13 relates to the method of any one of examples 1 to 11, wherein the switching comprises switching from one of the first communication path and the second communication path to the other of the first communication path and the second communication path for communications with the wireless communication network, wherein the switching comprises: starting to monitor, by the UE responsive to the explicit indication, the other of the first communication path and the second communication path.

An example 14 relates to the method of any one of examples 1 to 11, wherein the switching comprises switching from one of the first communication path and the second communication path to the other of the first communication path and the second communication path for communications with the wireless communication network, wherein the switching comprises: stopping monitoring, by the UE responsive to the explicit indication or after a transition time period, of the one of the first communication path and the second communication path.

An example 15 relates to the method of example 12 or example 13, wherein the transition time period is consistent with any one or more of: an indication of the transition time period provided in the received signaling, a time delay between receipt of the signaling and receipt of further signaling associated with deactivation of the first communication path or the second communication path; a predetermined time period; a time period between receipt of the signaling and expiry of a timer; and completion of a retransmission process that was initiated before the receiving.

An example 16 relates to the method of any one of examples 1 to 15, further comprising: monitoring, by the UE before receiving the signaling, both the first communication path and the second communication path after they are established.

An example 17 relates to a method comprising: communicating, by a first UE involved in a relay path that comprises a first communication path between a wireless communication network and a second UE, signaling comprising an explicit indication that the second UE is to switch between the first communication path and a second communication path for communications with the wireless communication network, the first communication path and the second communication path comprising multiple communication paths established for communications between the wireless communication network and the second UE before the signaling is communicated; operating, by the first UE, in a manner consistent with the switch between the first communication path and the second communication path by the second UE.

An example 18 relates to the method of example 17, wherein the communicating comprises receiving the signaling from a network device with which the second UE communicates through the first communication path, wherein the operating comprises modifying operation of the first UE responsive to the explicit indication.

An example 19 relates to the method of example 18, further comprising: providing, by the first UE to the second UE and responsive to the explicit indication, an implicit indication or an explicit indication that the second UE is to switch between the first communication path and the second communication path for communications with the wireless communication network.

An example 20 relates to the method of example 17, wherein the communicating comprises transmitting the signaling toward the second UE.

An example 21 relates to the method of example 20, further comprising: receiving, by the first UE, an implicit indication or a further explicit indication that the second UE is to switch between the first communication path and the second communication path for communications with the wireless communication network, wherein the operating comprises modifying operation of the first UE responsive to the implicit indication or the further explicit indication received by the first UE.

An example 22 relates to the method of any one of examples 17 to 21, wherein the signaling comprises one or both of: semi-static signaling and dynamic signaling.

An example 23 relates to the method of example 22, wherein the signaling comprises any one or more of: RRC signaling, MAC-CE signaling, DCI, SCI, header information, or the explicit indication carried by data.

An example 24 relates to the method of any one of examples 17 to 23, wherein the explicit indication comprises an explicit indication associated with switching from the first communication path to the second communication path, wherein operating comprises ceasing of monitoring for communication traffic over the first communication path that is associated with the second UE.

An example 25 relates to the method of any one of examples 17 to 23, wherein the explicit indication comprises an explicit indication associated with switching to the first communication path from the second communication path, wherein operating comprises starting of monitoring for communication traffic over the first communication path that is associated with the second UE.

An example 26 relates to the method of any one of examples 17 to 25, wherein the operating comprises monitoring the first communication path for communication traffic that is associated with the second UE during a transition time period in which communication traffic is communicated through the second communication path.

An example 27 relates to the method of example 26, wherein the transition time period is consistent with any one or more of: an indication of the transition time period provided in the signaling, a time delay between communication of the signaling and receipt of further signaling associated with deactivation of the first communication path; a predetermined time period; a time period between communication of the signaling and expiry of a timer; and completion of a retransmission process that was initiated before the signaling is communicated.

An example 28 relates to a method comprising: determining whether a path switch condition is satisfied, the path switch condition comprising a condition for a UE to switch between multiple communication paths established for communications with a wireless communication network before the determining, the multiple communication paths comprising a first communication path and a second communication path, the first communication path comprising a relay path between the UE and the wireless communication network; transmitting, responsive to determining that the path switch condition is satisfied, signaling to cause the UE to switch between the first communication path and the second communication path for communications with the wireless communication network, the signaling comprising an explicit indication that the UE is to switch between the first communication path and the second communication path for communications with the wireless communication network.

An example 29 relates to the method of example 28, wherein the determining comprises determining, by a further UE that is involved in the relay path, that the UE is to switch between the first communication path and the second communication path for communications with the wireless communication network.

An example 30 relates to the method of example 29, wherein the determining is based on an implicit indication or a further explicit indication received by the further UE.

An example 31 relates to the method of example 28, further comprising, before the determining: establishing the first communication path and the second communication path.

An example 32 relates to the method of example 28, wherein the transmitting comprises transmitting the signaling through any one or more of: the first communication path; the second communication path; and a further communication path between the UE and the wireless communication network.

An example 33 relates to the method of any one of examples 28 to 32, wherein the signaling comprises one or both of: semi-static signaling and dynamic signaling.

An example 34 relates to the method of example 33, wherein the signaling comprises any one or more of: RRC signaling, MAC-CE signaling, DCI, SCI, header information, or the explicit indication carried by data.

An example 35 relates to the method of any one of examples 28 to 34, wherein the explicit indication comprises an explicit indication for switching from one of the first communication path and the second communication path to the other of the first communication path and the second communication path.

An example 36 relates to the method of any one of examples 28 to 34, wherein the signaling is to cause the UE to switch from one of the first communication path and the second communication path to the other of the first communication path and the second communication path for communications with the wireless communication network, wherein the explicit indication comprises an explicit indication for deactivation of the one of the first communication path and the second communication path An example 37 relates to the method of any one of examples 28 to 34, wherein the explicit indication comprises an explicit indication for switching from one of the first communication path and the second communication path to the other of the first communication path and the second communication path, wherein the signaling further comprises an explicit indication for deactivation of the one of the first communication path and the second communication path.

An example 38 relates to the method of any one of examples 28 to 34, wherein the explicit indication comprises an explicit indication for switching from one of the first communication path and the second communication path to the other of the first communication path and the second communication path, wherein the method further comprises: transmitting further signaling that comprises a further explicit indication that the UE is to deactivate the one of the first communication path and the second communication path.

An example 39 relates to the method of any one of examples 28 to 38, further comprising: maintaining communications between the UE and the wireless communication network through both the first communication path and the second communication path during a transition time period.

An example 40 relates to the method of any one of examples 28 to 38, wherein the explicit indication comprises an explicit indication for switching from one of the first communication path and the second communication path to the other of the first communication path and the second communication path, wherein the method further comprises duplicating data for the UE on both the first communication path and the second communication path during a transition time period.

An example 41 relates to the method of example 39 or example 40, wherein the transition time period is consistent with any one or more of: an indication of the transition time period provided in the signaling, a time delay between the transmitting of the signaling and transmitting of further signaling associated with deactivation of the first communication path or the second communication path; a predetermined time period; a time period between transmitting of the signaling and expiry of a timer; and completion of a retransmission process that was initiated before the transmitting.

An example 42 relates to an apparatus comprising: a communication interface; a processor, coupled to the communication interface; a non-transitory computer readable storage medium, coupled to the processor, storing programming for execution by the processor, the programming including instructions to perform the method of any one of examples 1 to 41.

An example 43 relates to a computer program product comprising a non-transitory computer readable storage medium storing programming, the programming including instructions to perform the method of any one of examples 1 to 41.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

The invention claimed is:

1. A method comprising:
   establishing, by a user equipment (UE), a first communication path for communications with a wireless communication network, and then establishing a second communication path for communications with the wireless communication network, one or both of the first communication path and the second communication path comprising a relay path between the UE and the wireless communication network;
   communicating duplicated traffic on both of the first communication path and the second communication path;
   receiving, by the UE, signaling that comprises an explicit indication for release of the first communication path; and
   releasing, by the UE responsive to the explicit indication, the first communication path.

2. The method of claim 1, wherein the first communication path and the second communication path are established for communications between the UE and a network device of the wireless communication network.

3. The method of claim 1, wherein the first communication path is established for communications between the UE and a first network device of the wireless communication network, and the second communication path is established for communications between the UE and a second network device of the wireless communication network.

4. The method of claim 1, wherein the signaling comprises any one or more of: Radio Resource Control (RRC) signaling, Medium Access Control-Control Element (MAC-CE) signaling, Downlink Control Information (DCI), Sidelink Control Information (SCI), or header information.

5. The method of claim 1, wherein the receiving and the releasing comprise switching from the first communication path to the second communication path for communications with the wireless communication network responsive to the explicit indication for release of the first communication path.

6. The method of claim 1, wherein the communicating comprises communicating the duplicated traffic on both the first communication path and the second communication path during a transition time period.

7. The method of claim 6, wherein the transition time period is consistent with any one or more of: an indication of the transition time period provided in further signaling that comprises an explicit indication for switching from the first communication path to the second communication path, a time delay between receipt of the further signaling and receipt of the signaling; a predetermined time period; a time period between receipt of the further signaling and expiry of a timer; and completion of a retransmission process that was initiated before receiving the further signaling.

8. The method of claim 1, wherein the communicating comprises:
   starting to monitor, by the UE responsive to an explicit indication for switching from the first communication path to the second communication path, the second communication path.

9. The method of claim 1, wherein the communicating comprises:
   stopping monitoring, by the UE after a transition time period or responsive to an explicit indication for switching from the first communication path to the second communication path, of the first communication path.

10. An apparatus comprising:
a processor; and
a non-transitory computer readable storage medium, coupled to the processor, storing programming for execution by the processor, the programming including instructions to:
establish, by the apparatus, a first communication path for communications with a wireless communication network, and then establishing a second communication path for communications with the wireless communication network, one or both of the first communication path and the second communication path comprising a relay path between the apparatus and the wireless communication network;
communicate, by the apparatus, duplicated traffic on both of the first communication path and the second communication path;
receive, by the apparatus, signaling that comprises an explicit indication for release of the first communication path; and
release, by the apparatus responsive to the explicit indication, the first communication path.

11. The apparatus of claim 10, wherein the first communication path and the second communication path are established for communications between the apparatus and a network device of the wireless communication network.

12. The apparatus of claim 10, wherein the first communication path is established for communications between the apparatus and a first network device of the wireless communication network, and the second communication path is established for communications between the apparatus and a second network device of the wireless communication network.

13. The apparatus of claim 10, wherein the signaling comprises any one or more of: Radio Resource Control (RRC) signaling, Medium Access Control-Control Element (MAC-CE) signaling, Downlink Control Information (DCI), Sidelink Control Information (SCI), or header information.

14. The apparatus of claim 10, wherein the instructions to receive the signaling and to release the first communication path cause the apparatus to switch from the first communication path to the second communication path for communications with the wireless communication network responsive to the explicit indication for release of the first communication path.

15. The apparatus of claim 10, wherein the instructions to communicate comprise instructions to communicate the duplicated traffic on both the first communication path and the second communication path during a transition time period.

16. The apparatus of claim 15, wherein the transition time period is consistent with any one or more of: an indication of the transition time period provided in further signaling that comprises an explicit indication for switching from the first communication path to the second communication path, a time delay between receipt of the further signaling and receipt of the signaling; a predetermined time period; a time period between receipt of the further signaling and expiry of a timer; and completion of a retransmission process that was initiated before receiving the further signaling.

17. The apparatus of claim 10,
wherein the instructions to communicate comprise instructions to:
start to monitor, by the apparatus responsive to an explicit indication for switching from the first communication path to the second communication path, the second communication path.

18. The apparatus of claim 10,
wherein the instructions to communicate comprise instructions to:
stop monitoring, by the apparatus after a transition time period or responsive to an explicit indication for switching from the first communication path to the second communication path, of the first communication path.

19. A computer program product comprising a non-transitory computer readable storage medium storing programming, the programming including instructions to:
establish, by an apparatus, a first communication path for communications with a wireless communication network, and then establishing a second communication path for communications with the wireless communication network, one or both of the first communication path and the second communication path comprising a relay path between the apparatus and the wireless communication network;
communicate, by the apparatus, duplicated traffic on both of the first communication path and the second communication path;
receive, by the apparatus, signaling that comprises an explicit indication for release of the first communication path; and
release, by the apparatus responsive to the explicit indication, the first communication path.

20. The computer program product of claim 19,
wherein the instructions to communicate comprise instructions to communicate the duplicated traffic on both the first communication path and the second communication path during a transition time period,
wherein the transition time period is consistent with any one or more of: an indication of the transition time period provided in further signaling that comprises an explicit indication for switching from the first communication path to the second communication path, a time delay between receipt of the further signaling and receipt of the signaling; a predetermined time period; a time period between receipt of the further signaling and expiry of a timer; and completion of a retransmission process that was initiated before receiving the further signaling.

* * * * *